United States Patent [19]

Kassatly

[11] Patent Number: 5,157,491
[45] Date of Patent: Oct. 20, 1992

[54] METHOD AND APPARATUS FOR VIDEO BROADCASTING AND TELECONFERENCING

[76] Inventor: L. Samuel A. Kassatly, Yu-Hausu Gifu 7C, 15-1 Utoboya-Cho, Gifu-shi 500, Japan

[21] Appl. No.: 573,539

[22] Filed: Aug. 27, 1990

Related U.S. Application Data

[63] Continuation-in-part of Ser. No. 457,403, Dec. 18, 1989, Pat. No. 4,975,771, which is a continuation-in-part of Ser. No. 308,826, Feb. 10, 1989, Pat. No. 4,903,126, and a continuation-in-part of Ser. No. 258,722, Oct. 17, 1988, abandoned.

[51] Int. Cl.$^5$ .................... H04N 7/04; H04N 7/14
[52] U.S. Cl. ..................... 358/146; 358/85; 379/54; 379/202; 340/815.23; 370/62
[58] Field of Search .............. 358/146, 142, 86, 85, 358/181, 47, 55; 379/53, 54, 202; 340/815.23, 784; 370/23, 53, 60, 62

[56] References Cited

U.S. PATENT DOCUMENTS

| | | | |
|---|---|---|---|
| 3,213,201 | 10/1965 | Flood et al. | 220/301 |
| 3,693,090 | 9/1972 | Gabriel | 358/86 |
| 3,733,430 | 5/1973 | Thompson et al. | 358/84 |
| 4,215,369 | 7/1980 | Iijima | 358/146 |
| 4,215,370 | 7/1980 | Kirk | 358/142 |
| 4,300,161 | 11/1981 | Haskell | 358/142 |
| 4,408,836 | 10/1983 | Kikuno | 350/334 |
| 4,410,980 | 10/1983 | Takasaki et al. | 370/109 |
| 4,442,454 | 4/1984 | Powell | 358/167 |
| 4,450,477 | 5/1984 | Lovett | 358/142 |
| 4,467,356 | 8/1984 | McCoy | 358/146 |
| 4,533,936 | 8/1985 | Tiemann et al. | 358/12 |
| 4,593,318 | 6/1986 | Eng et al. | 358/146 |
| 4,597,058 | 6/1986 | Izumi et al. | 364/900 |
| 4,646,135 | 2/1987 | Eichelberger et al. | 358/146 |
| 4,650,929 | 3/1987 | Boerger et al. | 358/86 |
| 4,654,799 | 3/1987 | Ogacki et al. | 364/900 |
| 4,689,661 | 8/1987 | Barbieri et al. | 358/12 |
| 4,806,922 | 2/1989 | McLaughlin et al. | 340/784 |
| 4,824,215 | 4/1989 | Joseph et al. | 350/339 |
| 4,832,457 | 5/1989 | Saitoh et al. | 350/334 |
| 4,874,227 | 10/1989 | Matsukawa et al. | 350/334 |
| 4,896,209 | 1/1990 | Matsuzaki et al. | 358/86 |
| 4,903,126 | 2/1990 | Kassatly | 358/146 |
| 4,975,771 | 12/1990 | Kassatly | 358/146 |

OTHER PUBLICATIONS

AD-A206-140 "Investigation of Optional Compression Techniques . . . ".
AD-A210-974-"Robot Vehicle Video Imaging Compression".
AD-A191-577. "Narrative Compression Coding . . . ".
AD-A194-681-"SNAP/DDN Interface for Information Exchange".

(List continued on next page.)

Primary Examiner—James J. Groody
Assistant Examiner—Safet Metjahic
Attorney, Agent, or Firm—L. S. A. Kassatly

[57] ABSTRACT

A video teleconferencing network among several remote sites includes a central switching system for receiving and processing signals from the remote sites. Video cameras are located at each one of the remote sites for generating video signals. Each camera includes an optical system having a plurality of lens systems for processing colors of different frequencies. Each one of the lens systems includes a shutter for generating amplitude vectorial signals proportional to the amplitude of the color signal being processed by the lens system. Each one of the lens systems further includes means responsive to the frequency of the corresponding color being processed by the particular lens system, for generating vectorial signals proportional to the frequency of the color signal being processed by the lens system. A modular monitor has a relatively small size liquid crystal modular screen, for use by an individual user to display texts and graphics. The modular screen includes a plurality of modules selectively engageable to one another, by the individual user, to form a single unitary screen. A user station is adapted to be coupled to the single unitary screen, for controlling the display of information thereon.

20 Claims, 18 Drawing Sheets

OTHER PUBLICATIONS

AD-A206-999-"Geometric Methods with Application ...".
AD-A174-316-"A Packet Communication Network ...".
AD-A207-814-"Random Transform Analysis ...".
AD-A188-293-"A Video-Rate CED Two Dimensional ...".
AD-A198-390-"Navy Satellite Communications ...".
"Time-multiplexed analog transmission of three broadcast-quality Television channels through one satellite transponder" pp. 676-684. Journal on Selected Areas in Communications, IEEE, vol. SAC-5, No. 4, May 1987, Y.-S. Kao et al.

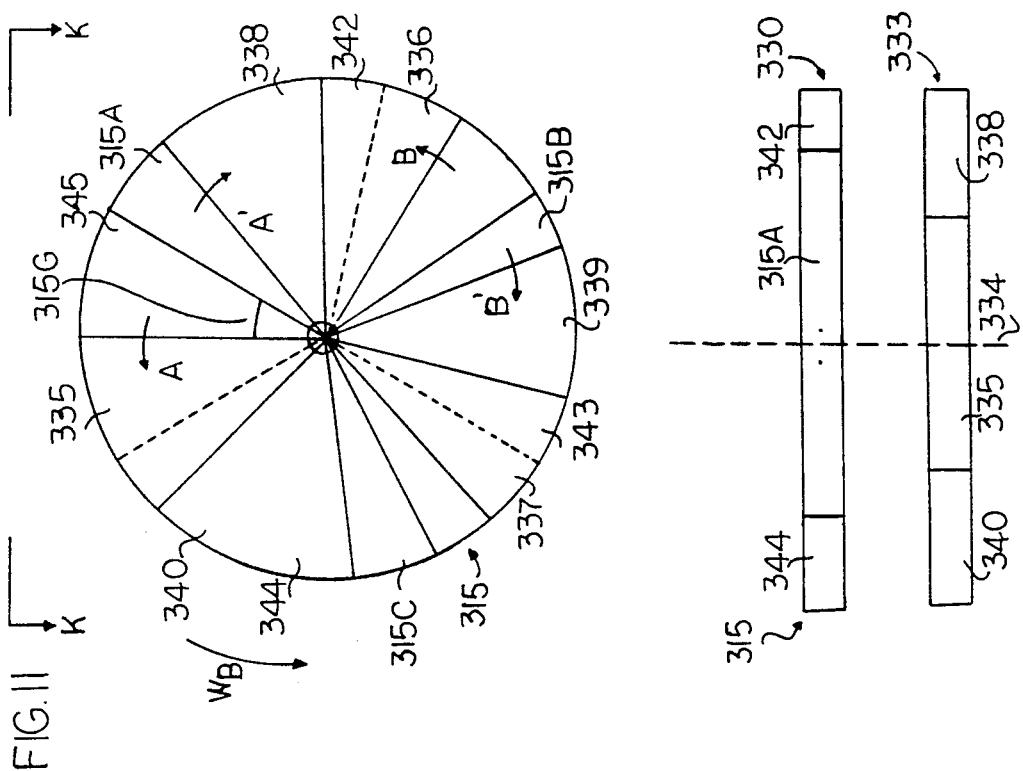
FIG. 11
FIG. 12
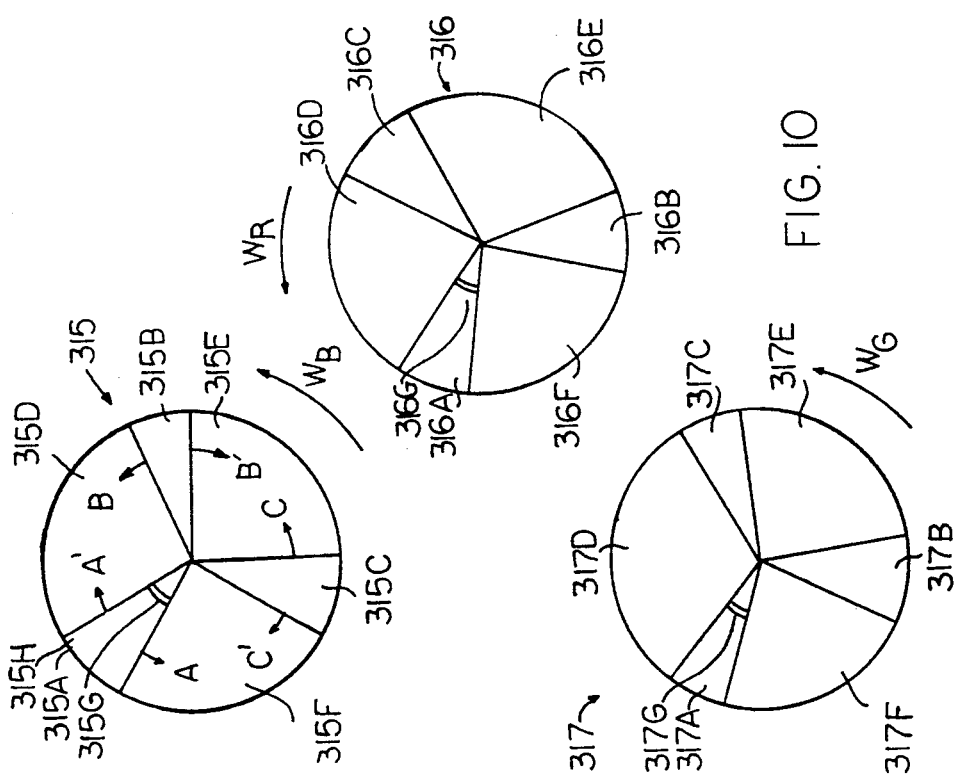
FIG. 10

METHOD AND APPARATUS FOR VIDEO BROADCASTING AND TELECONFERENCING

CROSS REFERENCE TO RELATED APPLICATIONS

This is a continuation-in-part of (1) the co-pending U.S. Pat. No. 457,403, filed Dec. 18, 1989, now issued as U.S. Pat. No. 4,975,771 on Dec. 4, 1990, which in turn is a continuation-in-part of U.S. Ser. No. 308,826, filed Feb. 10, 1989, now U.S. Pat. No. 4,903,126 issued Feb. 20, 1990; (2) co-pending Canadian patent application Ser. No. 2,007,964; (3) Patent Cooperation Treaty application Ser. No. PCT/US89/05713, filed Dec. 19, 1989, now abandoned; and (4) U.S. Pat. No. 07/258,722 filed Oct. 17, 1988, now abandoned.

BACKGROUND OF THE INVENTION

1. Technical Field

The present invention relates in general to telecommunications systems such as television and cable television (CATV) broadcasting. It more particularly relates to a method and apparatus for an efficient video broadcasting and teleconferencing system, and a camera and monitor used with this teleconferencing system.

2. Background Information

I. TELECONFERENCING

Conventional Television and TV cable broadcasting is generally carried out on a real-time basis. For instance, it takes the same length of time to broadcast or transmit a TV program as it does to receive and display the program. Such a broadcasting method has proven to be less than completely desirable due to limited TV bandwidth and channels allocation therein.

Channel availability has been a crucial limitation in the broadcasting industry. Channel allocation has been very valuable and expensive. It has precluded several interested persons, small businesses, consumers and local community chapters from accessing the TV broadcasting networks.

TV broadcasting has become the single most important and popular means for accessing and educating large numbers of citizens. Therefore, TV broadcasting has a direct effect on the right to free speech and expression as guaranteed by several constitutions around the world, including that of the United States of America.

Research and development has been carried out in the TV and video broadcasting field. The following patents exemplify the state of the art in the relevant field:

1. U.S. Pat. No. 4,215,369 by Ijima, entitled "Digital Transmission System for Television Video Signals", and assigned to Nippon Electric Co.
2. U.S. Pat. No. 4,300,161 by Haskell, entitled "Time Compression Multiplexing of Video Signals", and assigned to Bell Telephone Laboratories, Incorporated.
3. U.S. Pat. No. 4,410,980 by Takasaki, entitled "Time Division Multiplexing System", and assigned to Hitachi, Ltd.
4. U.S. Pat. No. 4,533,936 by Tiemann, entitled "System for Encoding and Decoding Video Signals", and assigned to General Electric Co.
5. U.S. Pat. No. 4,593,318 by Eng, entitled "Technique for the Time Compression Multiplexing of Three Television Signals", and assigned to AT&T Bell Laboratories.
6. U.S. Pat. No. 4,646,135 by Eichelberger, entitled "System for Allowing Two Television Programs Simultaneously to Use the Normal Bandwidth for One Program by Chrominance Time Compression and Luminance Bandwidth Reduction", and assigned to General Electric Co.

The United States Department of Defense has sponsored several projects relating to the field of the present invention. The following Defense Technical Information Center (DTIC) technical reports exemplify some of these projects:

1. AD-A206 140, entitled "Investigation of Optional Compression Techniques for Dither Coding."
2. AD-A210 974, entitled "Robot Vehicle Video Image Compression."
3. AD-A191 577, entitled Narrative Compression Coding for a Channel with Errors."
4. AD-A194 681, entitled "SNAP/DDN Interface for Information Exchange."
5. AD-A174 316, entitled "A Packet Communication Network Synthesis and Analysis System."
6. AD-A206 999, entitled "Geometric Methods with Application to Robust Detection and Estimation."
7. AD-A207 814, entitled "Random Transform Analysis of a Probabilistic Method for Image Generation."
8. AD-A188 293, entitled "A Video-Rate CCD Two-Dimensional Cosine Transform Processor."
9. AD-A198 390, entitled "Navy Satellite Communications in the Hellenic Environment."

Therefore, it would be highly desirable to have a new and improved method and apparatus for video teleconferencing and for increasing video channel availability and for rendering the video channel allocation process more efficient. The new method and apparatus should be relatively simple and inexpensive to implement and to place into effect. The new method and apparatus should also be capable of being implemented with new, as well as existing television or receiver sets.

II. VIDEO CAMERAS

The first generation of color studio cameras used three image orthicon tubes, which were essentially three identical monochrome camera channels with provisions for superposing the three output-signal rasters mechanically and electrically. The optical system consisted of a taking lens which was part of a four-lens assembly. The scene was imaged in the plane of a field lens using a 1.6-inch diagonal image format. The real image in the field lens was viewed by a back-to-back relay lens assembly of approximately 9 inch focal length. At the rear conjugate distance of the optical relay was placed a dichromic-prism beam splitter with color-trim filters.

In this manner, the red, blue, and green components of the screen lens were imaged on the photo-cathodes of the three image orthicon tubes. A remotely controlled iris located between the two relay-lens elements was used to adjust the exposure of the image orticons. This iris was the only control required in studio operation. These cameras are no longer in use because of their size, cost, operating and setup requirements, compared to photoconductive cameras.

Four-tube (luminance-channel) cameras were then introduced when color receivers served a small fraction of the audience. The viewer of color program in monochrome became aware of lack of sharpness. Using a high-resolution luminance channel to provide the brightness component in conjunction with three chrominance channels for the Red (R), Green (G) and Blue (B) components produced images that were sharp and independent of registry errors.

Improvements in scanning components and circuits have eliminated the need for use of a separate luminance channel in order to obtain adequate resolution. However, for a period of time, the four-tube approach continued to be used for telecine applications where the inclusion of an additional vidicon channel was not an appreciable cost consideration or of mechanical complexity. Nevertheless, the four-tube cameras were supplanted by the three-tube photoconductive cameras and by non-storage flying-spot and charge coupled device scanning systems.

A color television camera must produce R, G and B video signals which complement the characteristics of the NTSC three-gun three-phosphor standard additive display tube. For both live and film cameras it is now common to use a camera with three photoconductive pickup tubes with a high-efficiency dichromic light splitter to divide the optical image from a zoom lens into three images of red, blue and green, with different spectral characteristics.

Light splitting is accomplished by a prism or by a relay lens and dichromic system. The prism has the advantage of small size and high optical efficiency but a disadvantage in that the three tubes are not parallel to each other and are thus more susceptible to misregistration produced by external magnetic fields. A more serious problem is that of obtaining a uniform bias light on the face of the tubes. Bias light producing 2 to 10 percent of the signal is used in most modern cameras to reduce lag effects. Nonuniformity of the bias light can produce color shading in dark areas of the picture. Most new designs now use the prism splitter.

Therefore, it would be highly desirable to have a new video camera that does not use multiple color optical splitters, and which improves the sharpness and resolution of the image.

One of the most important criteria for determining the picture quality of a color television camera is the signal-to-noise ratio, which is measured in decibels according to the following formula:

$$dB = 20 \cdot \log[\text{peak-to-peak video voltage} / \text{rms noise voltage}].$$

Noise also plays an important role in the quality of the video signals transmitted. Several types of radio noise must be considered in any design, though, in general, one type will be the dominant factor. In broad categories, the noise can be divided into two types: noise internal to the receiving system, and noise external to the receiving antenna.

The noise of the receiving system is often the controlling noise in systems operating above 100 MHz. This type of noise is due to antenna losses, transmission-line losses, and the circuit noise of the receiver itself.

Several costly designs, using elaborate mathematical equations, have been devised to reduce the noise factor and to improve the signal-to-noise ratio. However, low-cost circuit designs still include a relatively low signal-to-noise ratio, for cost effectiveness.

Therefore, it is desirable to have a new circuit design and method for improving signal-to-noise ratio in video broadcasting systems, and particularly in low cost video cameras and broadcasting systems.

III. LCD MONITORS

Liquid crystal display (LCD) monitors have become increasingly popular in the television and computer industries. In general, a conventional LCD monitor includes a single rigid screen which permits the display of either video signals or computer generated signals.

U.S. Pat. No. 4,874,227 issued to Matsukawa et al. describes a large-size crystal display which is used as a large picture display for a sign or advertisement at railway stations, airports or for projection at halls or theaters. Matsukawa teaches the use of a single unitary rigid large size display of fixed dimensions and size.

U.S. Pat. No. 4,806,922 issued to McLaughlin et al. generally describes a large size LCD having several nematic curvilinearly aligned phases (NCAP) liquid crystal material. The modules are positioned adjacent to one another to effect a single display having a relatively large area. The McLaughlin patent is incorporated herein by reference.

U.S. Pat. No. 4,597,058 issued to Joseph et al. discloses a large liquid crystal display electronic sign which employs several modules that are juxtaposed adjacent to one another on a transparent diffuser plate and a conducive liquid crystal coating layer between the plates.

Liquid crystals are also defined in several publications, among which is the "Electronics Engineers' Handbook", Third Edition, McGraw Hill Publications, page 6–36, where a general brief explanation of the use of liquid crystal displays in television, is given at page 20–120.

However, conventional liquid crystal monitors still include a single screen which does not enable the user to select the desired sizes and shapes of the screen. The size and weight of a LCD monitor are important features for the LCD to compete with other displays, and printed publications such as newspapers. For this purpose, the monitor should be small in size and light in weight. Additionally, conventional displays, including lap top computers, are generally inconvenient to transport, since the screen is a single rigid screen which commonly folds over the keyboard.

Furthermore, conventional displays do not generally address the growing elderly and disabled populace, who would be very inconvenienced by the fixed size of the conventional display monitors. At present, these monitors do not enable this group of people to accommodate the displayed material to their own personal needs. In some instances, an elderly person might wish to read a newspaper, but is prevented from doing so because of that person's inability to read small print characters, and to hold and flip through the relatively heavy paper.

Therefore, it would be desirable to have a display monitor which uses liquid crystal material, and which could be sized and dimensioned by the user according to the user's particular needs.

IV. PAPERLESS NETWORK

At present, information is widely spread and distributed by means of publications such as newspapers, books and magazines. Generally, publications are distributed individually to subscribers in a relatively cumbersome, costly and inefficient way. Furthermore, the reader or subscriber usually finds it bulky, cumbersome and inconvenient to carry or transport the printer publication for reading or reviewing it at a later time.

Printed publications can be relatively heavy, and can contain information that is not of particular interest to the reader. Additionally, there is a private and public concern with respect to the manner of disposing of the printed publications once they have been read, and are no longer of use. This constitutes substantial waste of resources, which has instigated attempts to recycle and reuse the paper. Nonetheless, the recycling process does not solve all the foregoing problems.

Some methods have been designed to substitute for the paper dissemination of information, among which are computers, audio and video cassettes, floppy disks and like devices. However, there has been no paperless device or method which substitutes entirely for the paper dissemination of information.

Therefore, there is a substantial need for a new and improved paperless network and method of using the same for disseminating information. The new network and method of using it should substantially reduce or substitute for the use of paper, thus reducing the cost of distribution and waste. The new network should render the transfer, transport, storage and review of published information convenient, and should permit a wasteless disposition thereof.

U.S. Pat. No. 4,597,058, issued to Izumi et al., and U.S. Pat. No. 4,654,799, issued to Ogaki et al. describe software vending machines, it being understood the "software" includes machine readable codes to the exclusion of "human readable" or printed publications.

Software vending machines address distinctly different problems than printed publications. The Izumi vending machine provides for a cartridge programming system and method for storing a library of programs and for loading a selected program or set of programs onto reprogrammable cartridge memories.

Other objects of the Izumi vending machine are to provide a method of maintaining a program library without requiring a large inventory of memory cartridges; and to provide a system for programming a cartridge memory without removing the semiconductor memory chip from the cartridge.

However, conventional software and other publications vending machines do not yet present an acceptable alternative to printed publications, which deal with different problems, among which are: (1) Inefficient and wasteful distribution of printed publications; (2) Indirect restraint on the United States constitutional freedom of speech; (3) Waste of natural resources; and (4) Environmental concerns.

With the foreseeable depletion of natural resources, such as timber, paper publications will become increasingly expensive to produce. This will eventually force the conventional printing industry to select alternate less expensive routes. After printing, the conventional paper publications are conventionally transported, stored, and distributed at an enormous and wasteful overhead, cost and labor.

Nowadays, small businesses and individuals find it quite prohibitive to advertise and/or to express their views in conventional publications, such as newspapers. As the cost of printed publications rises with the continuing decrease of natural resources, it will become even more forbidding for individuals and small businesses to retain, even the limited access to printed publications, they now enjoy. This problem will become a major concern in the near future, as it will very subtly become an indirect restraint on the constitutional freedom of speech.

Enormous and unsubstantiated waste of natural resources are presently generated by the use of conventional paper publications. For instance, it is highly unlikely that the subscribers read each and every line or page of their daily newspapers or weekly journals. Despite the huge waste of natural resources, conventional publications methods are still being used to publish newspapers which are not even read in their entirety.

Consider also the environmental issues relating to the waste generated by the conventional paper publications. Recycling is becoming increasingly popular in industrialized countries such as the United States, and other countries are following suit. Recycling bins dedicated to paper are sprouting nationwide, and dumping sites are filling up and becoming harder to locate due to increasing social and environmental pressures.

Therefore, it would be highly desirable to have a new system which will ultimately substitute for the conventional printed publications, and which will render the distribution and dissemination of information efficient and economical, and as such, more accessible to the members of the general public. The new system should eliminate or substantially reduce the current impermissible waste of natural resources which are depleted by the conventional publication industry.

SUMMARY OF THE INVENTION

Therefore, it is an object of the present invention to address the above concerns, and to provide adequate solutions thereto.

Briefly, the above and further objects and features of the present invention are realized by providing a new and improved video broadcasting and interactive video method and apparatus. One example of such interactive video system is video teleconferencing, which provides two-way visual, audio and graphics communication between several remotely located persons, thus allowing them to interact, as if they were meeting in person at the same location.

The simulation of such meeting conditions is becoming more popular, particularly with the time and costs savings achieved by the teleconferencing systems. It is therefore one object of the present invention to simulate in-personam meeting conditions as closely as possible. The new teleconferencing system is achieved by providing a central switching system for receiving and processing signals from the remote sites. Cameras located at the remote sites generate video signals.

The central switching system includes means for allocating a different channel to the video signals from each one of the remote sites, such that each channel is indicative of one of the remote sites and has a predetermined carrier frequency. A scanning circuitry scans the allocated channels to generate signals identificative of these allocated channels. A feedback system feeds back the channel identifying signals to the remote sites over a first carrier frequency, and a multiplexer compresses and multiplexes the signals from the selected channels over a second carrier frequency.

Each remote site includes selection means for using the feedback channel identifying signals to selectively identify the channels to be received by each remote site; means for receiving the multiplexed signals; means for demultiplexing and separating the received signals into separate channels; means for storing the separated signals for a predetermined period of time; means for decompressing and reconstructing the signals of the selected channel on a real-time basis; and a monitor for displaying the reconstructed signals of the selected channel on a real-time basis.

The above objects of the present invention are also realized by providing a new camera system and method for operating the same. The camera system includes an optical system having a plurality of lens systems for processing colors of different frequencies. Each one of the lens systems includes a shutter for generating amplitude vectorial signals proportional to the amplitude of the color signal being processed by the lens system.

Each one of the lens systems further includes means responsive to the frequency of the corresponding color being processed by the particular lens system, for generating vectorial signals proportional to the frequency of the color signal being processed by the lens system. An amplitude mixing circuit generates a resulting amplitude signal proportional to the vectorial sum of the amplitude vectorial signals, and a frequency mixing circuit generates a resulting frequency signal proportional to the vectorial sum of frequency vectorial signals.

In the preferred embodiment, the optical system includes a three lens system means for processing blue, red and green color signals. The amplitude vectorial signals are proportional to the amplitudes of the blue, red and green signals and the frequency vectorial signals are proportional to the frequencies of the blue, red and green signals.

The lens systems are rotated with angular velocities (Wb, Wr and Wg) proportional to the frequencies of the blue, red and green colors respectively, selected from the respective color frequency spectrum. The resulting vectorial amplitude signal (Ao) is calculated be mixing the blue, red and green amplitude vectorial signals (Ab, Ar and Ag), as follows:

$$Ao = Ar.1 + Ag.m + Ab.n,$$

where 1, m and n are unit vectors. The resulting vectorial frequency signal (Wo) is calculated be mixing the blue, red and green frequency vectorial signals (Wb, Wr and Wg), as follows:

$$Wo = Wr.i + Wg.j + Wb.k,$$

where i, j and k are unit vectors; the vectorial units 1, m and n have equal absolute values; and the absolute values of the vectorial units i, j, and k are proportional to the selected frequencies of the red, green and blue colors respectively.

Therefore, the video camera does not use multiple color optical splitters, and further improves the sharpness and resolution of the image. The camera system includes a new circuit design and method for improving signal-to-noise ratio in video broadcasting systems, and particularly in low cost video cameras and broadcasting systems.

The above objects of the present invention are also realized by providing a new modular liquid crystal monitor and method of operating the same. The modular system includes a relatively small size liquid crystal modular screen, for use by an individual user to display texts and graphics. The modular screen includes a plurality of modules selectively engageable to one another, by the individual user, to form a single unitary screen. A user station is adapted to be coupled to the single unitary screen, for controlling the display of information thereon. The screen modules are similarly selectively disengageable from one another by the individual user.

Each one of the modules includes a plurality of horizontal matrix transistor elements and a plurality of vertical matrix transistor elements each, such that each one of the transistor elements has a drain and a gate. The drain shift register provides output signals from the drains of the vertical matrix transistor elements; and the gate shift register provides output signals from the gates of the horizontal matrix transistor elements.

The drain shift register from the modules are selectively, serially coupled to form a single drain shift register for the unitary screen, and the gate shift register from the modules are selectively, serially coupled to form a single gate shift register for the unitary screen.

The above objects of the present invention are also realized by providing a new paperless publication system and a method for operating the same. The inventive modular screen and the paperless publication and method of operation provide the following advantages:
1. Efficient and economic distribution of othrewise conventional printed publications;
2. Promote the First Amendment constitutional freedom of speech;
3. Eliminate waste of natural resources;
4. Eliminate environmental problems;
5. Provide ultimate substitute for otherwise conventional printed publications by:
    A. COMPETITIVE PRICING: For the system to become a substitute for printed publications, the cost of using the system should be competitively priced with the printed publications. This is accomplished by the user station which does not necessarily need to be an expensive computer terminal, and which can be operated independently as a read only device that allows the reader to scan through the publications stored in the memory such as a floppy disc. Therefore, the user station does not require all the fancy accessories of the regular computer, and it is affordable to the readers of printed publications.
    B. EASE OF USE: The size and weight of the user station is an important aspect for its success. In fact, to compete with printed publications, it should be small in size and light in weight. Conventional lap top computers are generally expensive, not readily affordable by the readers of newspapers (i.e. printed publications), and inconvenient to transport. The modular feature of the screen in the user station is, at the same time, friendly to use, easy to assemble, very convenient to transport and store.

As such, the modular screen provides comfort to the reader, and at the same time it is sufficiently compact for easy and practical transportation and storage.

C. BROAD TARGET CLIENTELE BASIS: The present user station, with its modular screen addresses a target market that is not addressed by either the patented software vending machines, such as the Izumi vending machine, nor by the present publishing companies. This growing target market includes the elderly and the incapacitated who would be very inconvenienced by the small prints of the conventional paper publications. At present, it would be virtually inconceivable to enlarge the size of the paper prints to accommodate this target class, otherwise the size, volume and weight of the conventional paper publications would become obviously intolerable and will further accentuate all the above problems of waste and environmental concerns.

The modular screen could be sized and dimensioned according to the user's needs, in that by selecting the appropriate number of modules, the user can ask the user station, or the computer if the user station is hooked to the computer, to enlarge or "zoom in" the characters to better suit the user's vision.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 10 is a top plan view of three lens systems R, G and B) used in the optical system of FIG. 9;

FIG. 11 is a more detailed top plan view of one lens system of FIG. 10;

FIG. 12 is an enlarged side view of the lens system of FIG. 11, along the line K—K;

DESCRIPTION OF THE PREFERRED EMBODIMENT

Figure 1:
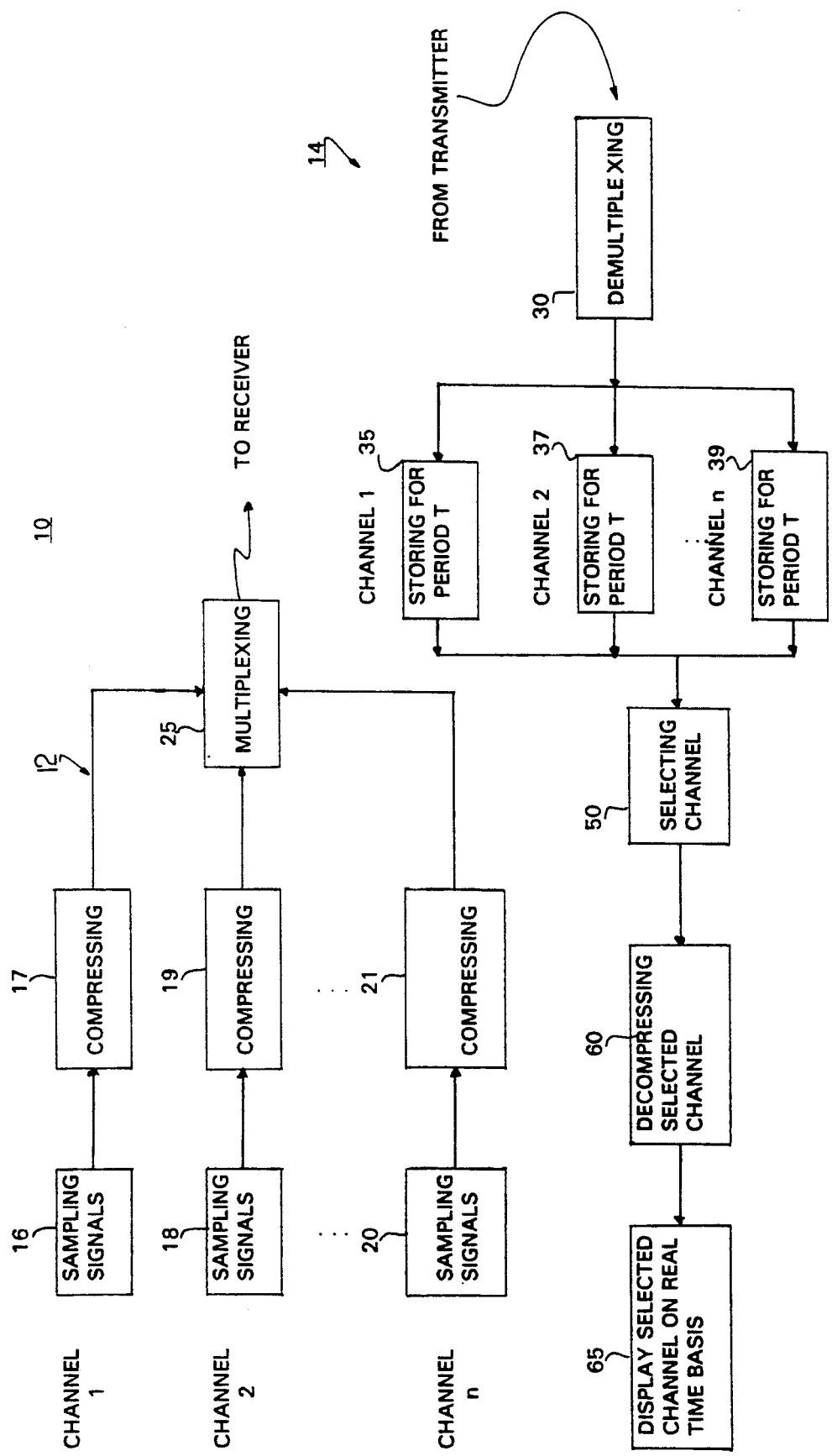
FIG. 1 is a block diagram of a method for broadcasting and receiving TV signals according to the present invention.

Referring now to the drawings, and more particularly to FIG. 1 thereof, there is illustrated a flow chart of a method 10 for broadcasting and receiving TV or video signals according to the present invention. The method 10 generally comprises a process 12 for processing signals to be transmitted, and a process 14 for processing the received signals.

In conventional television or video broadcasting systems the channels 1 through n are received and then displayed on a real time basis as corresponding channels 1 through n. These channels generally occupy the entire bandwidth at the receiver end. Thus, the channel availability in conventional broadcasting systems is severely limited by the allocated TV bandwidth. In most instances, this bandwidth is fixed or limited, and thus not expandable. Since each one of the received channels also generally have fixed bandwidths, the number of channels cannot be increased.

Wherefore, the present broadcasting method 10 (FIG. 1) and apparatus 200 (FIG. 3) offer a valuable advantage over the conventional methods and apparatus, in that the present method and apparatus enable the accommodation of a substantially larger number of channels in the limited TV bandwidth of the receiver.

The transmission process 12 generally includes multiplexing signals from a plurality of channels 1, 2, through n, prior to transmission. The multiplexed signals are then transmitted over a single base frequency. The channels 1 through n generally occupy the entire allocated television or video bandwidth.

The reception process 14 generally includes demultiplexing the transmitted signals, storing the received signals for a predetermined period of time T, and then displaying only the selected channel, on a screen.

Figure 4:
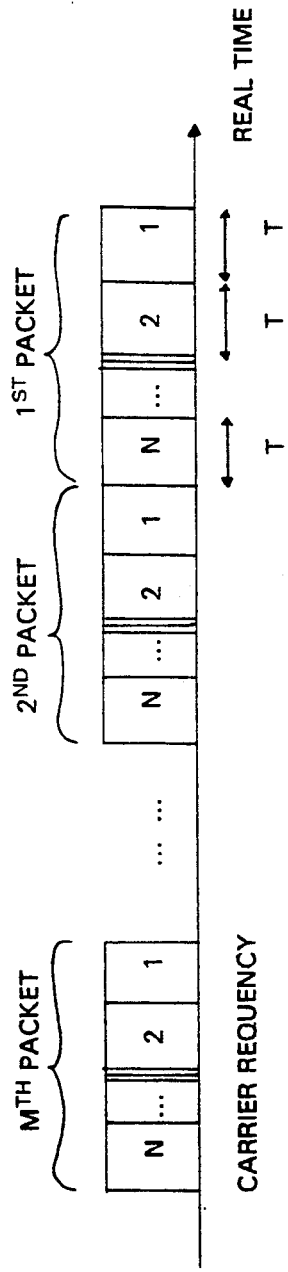
FIG. 4 is diagrammatic representation of the real-time signal processing at the output of a transmitter circuit which forms a part of the apparatus of FIG. 3.

Considering now the transmission process 12 in greater in detail, with respect to FIGS. 1 and 4, it includes sampling the signals of a first channel 1 as indicated at 16, for a predetermined period of time T. The sampled signals are then compressed at 17.

The signals of each one of the remaining channels 2 through n are processed similarly to channel 1, as indicated at 18, 19, 20 and 21. The multiplexing of the signals from all the channels 1 through n are then multiplexed at 25 in the form of successive packets. FIG. 4 illustrates the real-time multiplexing of the signals from all the channels 1 through n.

Figure 5:
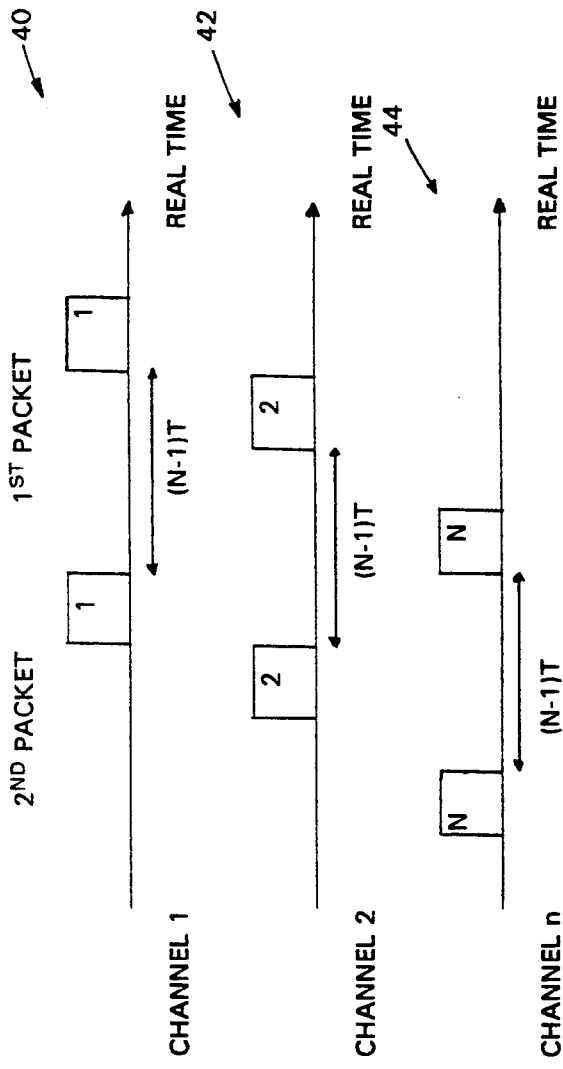
FIG. 5 is a diagrammatic representation of the real-time signal processing at the input of a receiver circuit which forms a part of the apparatus of FIG. 3.

Returning now to FIG. 1, the reception process 14 includes receiving the multiplexed signals and then demultiplexing the same at 30 into the same number of separate channels 1 through n. The signals are then independently stored as indicated at 35, 37 and 39 in FIG. 1, and at 40, 42 and 44 in FIG. 5.

Once a particular channel, such as channel 2 is selected at 50 (FIG. 1) only the signals of that particular channel are displayed on a real-time basis. However, since the last compressed signals in a packet, such as the first packet, for each channel, such as channel 2, are separated from the beginning of the compressed signals in the next packet, by $(n-1)T$, it is important to serially display the information contained in successive packets to avoid a non-continuous display of signals.

For this purpose, a processor or computer (not shown) at the receiving end decompresses the signals of the selected channel at 60, and reconstructs the initial real-time signals. Simultaneously, the processor expands the real-time spread of the restored signals over a period of T, thus bridging the $(n-1)T$ time between two successive packets. The restored signals are then displayed at 65.

At present, a major limitation to the period T is the limitation on the storage memory. However it should be understood that with the increased availability of expanded memory capacity, the period T will, in the future, be capable of being increased as required by the particular applications.

Figure 2:
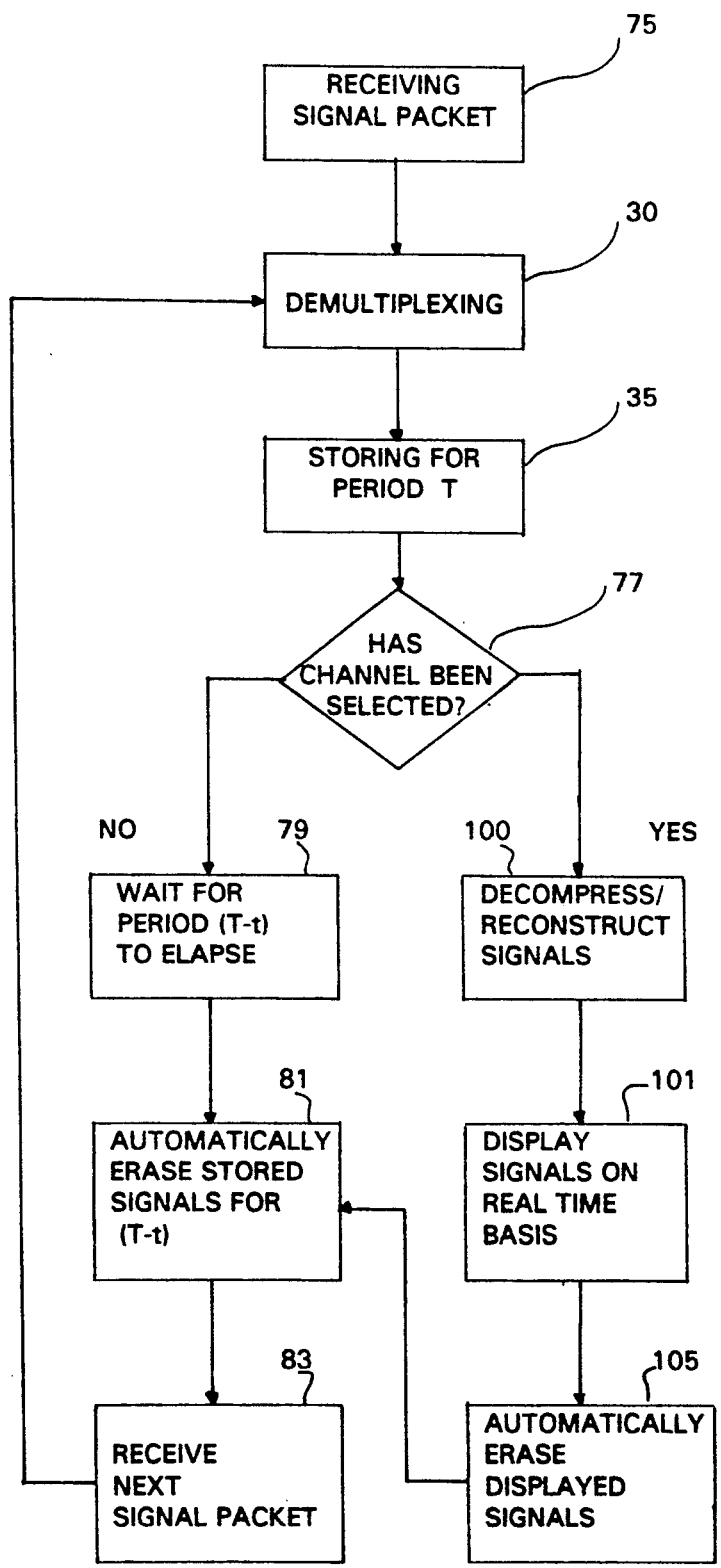
FIG. 2 is a flow chart further detailing the method for broadcasting of FIG. 1.

Considering now FIG. 2 in greater detail, it generally illustrates a flow chart further detailing the reception process of the signals for each individual channel such as channel 1. Such process is carried out by a software program at the receiving end or TV set.

The compressed signals are first received at 75, at the input of a demultiplexer 105 (FIG. 3) in the form of a packet of signals from various channels. The received signals are then demultiplexed at 30, and the demultiplexed signals are then stored for a predetermined period of time T, and for each channel separately from the others, as indicated at 35, 37 and 39 in FIG. 1.

The software then determines at 77 whether that particular channel has been selected. If it has not been selected, then the software waits at 79 for a period (T-t) to elapse; where "t" is defined as a relatively small incremental period compared to the period T.

At the end of the time period (T-t), the software automatically erases the signals stored of the elapsed period (T-t), at 81. The time period t allows the signals from the next packet to replace the erased signals which are received by the demultiplexer 105. Thus, the period t can be substantially smaller than T, and for certain applications, the period t can be so negligible that it can be ignored totally.

The signals from the next packet are then received at 83, and the cycle of multiplexing and storing the signals is then repeated.

If the software determines that the particular channel has been selected by the user or TV viewer, then the stored signals for that particular channel are decompressed and restored at 100, in the manner described above.

The reconstructed signals are then displayed on a real-time basis at 101. Thus, instead of using real-time transmission of the signals, the signals can now be transmitted in a compressed form, thereby clearing precious channel space and increasing channel availability, and the real-time signal reconstruction is carried out at the user's level without excessive cost.

The signals which have been displayed are automatically erased from the storage memory at 105. Once the signals are reconstructed at 100 the previously stored compressed signals are automatically erased at 81, and the cycle of multiplexing and storing the signals is then duplicated.

Figure 3:
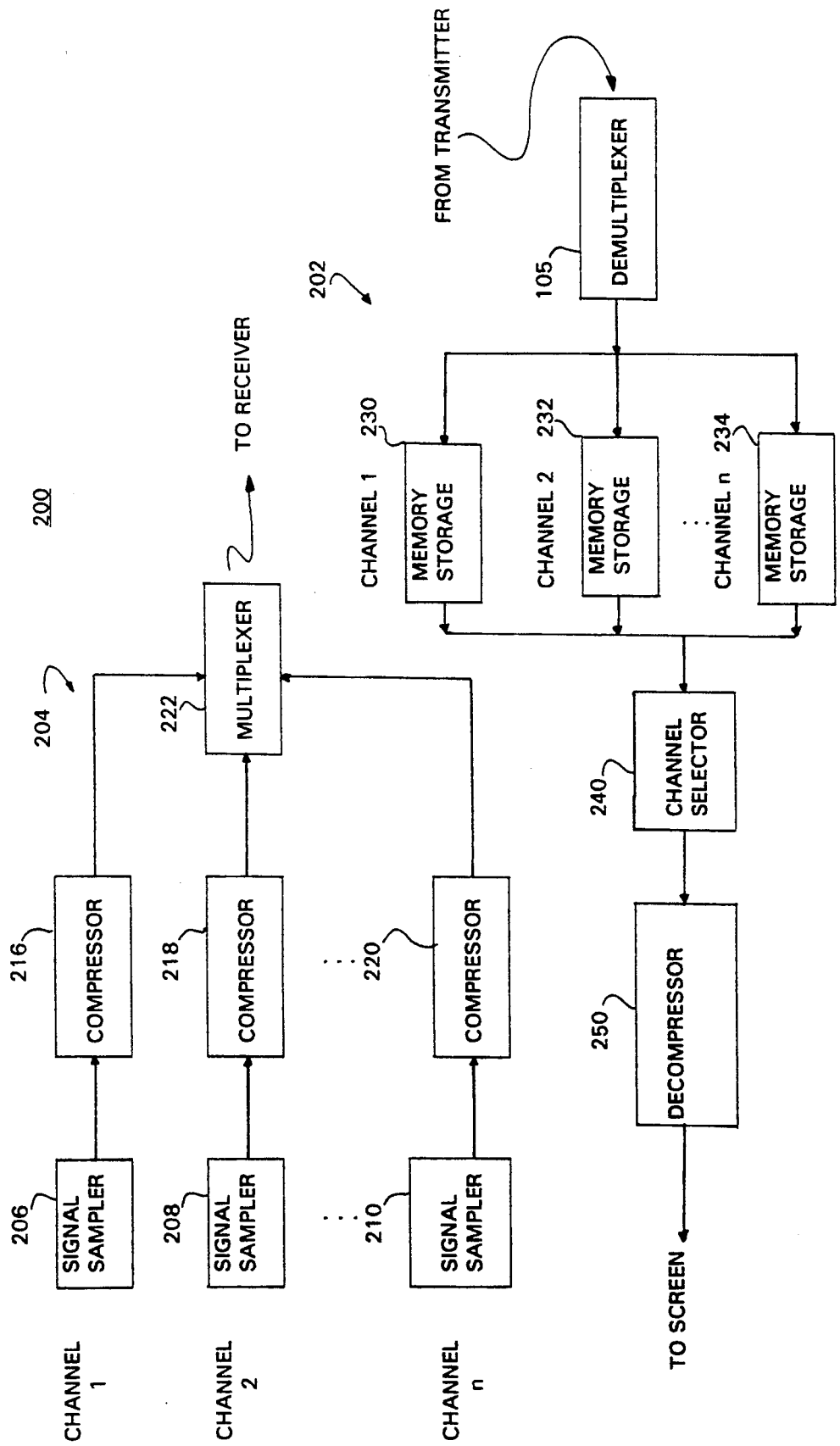
FIG. 3 is a block diagram of a TV broadcasting and reception apparatus which is constructed in accordance with the present invention, for implementing the broadcasting process of FIG. 1.

Referring now to FIG. 3, there is illustrated a block diagram of a TV broadcasting and reception apparatus 200 which is constructed in accordance with the present invention and which performs the steps of the process 10, as illustrated in FIGS. 1 and 2.

In operation, the user simply connects the reception circuit 202 of the apparatus 200 between his or her antenna or cable outlet and the conventional TV set, and operates his or her TV set as usual.

The apparatus 200 also serves another important function, namely to prevent copying or taping of the TV programs. This is accomplished by incorporating the reception circuit 202 inside the TV set, invisibly from the user, thereby preventing access to the reconstructed signals.

The apparatus 200 generally includes a transmission circuit 204 and the reception circuit 202. While the components used in the apparatus 200 are conventional parts, generally known and available in the electronics industry, it should be understood that the general architecture of the apparatus 200, including the combination of its components for producing the desired results, features and advantages is new.

The transmission circuit 204 generally includes a signal sampler 206, 208 and 210 for each one of the channels 1 through n respectively. It further includes a separate compression circuit 216, 218 and 220 for each one of the channels 1 through n. The compressed signals are then fed to a multiplexer 222, and are transmitted to the reception circuit 202.

The reception circuit 202 generally includes a demultiplexer 105 which separates the incoming signals into their respective separate channels. The demultiplexed signals are then stored in a separate memory storage 230, 232 or 234, for each one of the channels 1 through n.

A conventional channel selector 240 enables the user to select the channel he or she wishes to view. A decompressor 250 decompresses and reconstructs only those signals on the selected channel, which signals are then displayed on a screen or monitor (not shown).

An alternative embodiment of the present invention will now be described in conjunction with FIGS. 6, 7 and 8. The numeral references in FIGS. 6, 7 and 8 connote the same or substantially similar elements or processes to those in FIGS. 1, 2 and 3.

The alternative embodiment has several military and commercial applications. For instance, the inventive alternative broadcasting method 12 (FIGS. 6, 7) and apparatus 200 (FIG. 8) will provide substantial practical improvements to the United States Navy Telecommunications Systems (NTS), satellite communications, and sub-marine imaging.

In addition to the military applications, the inventive alternative broadcasting method and apparatus have versatile commercial applications, such as regular television, high definition TV (HDTV), as well as interactive television and educational video systems.

Figure 6:
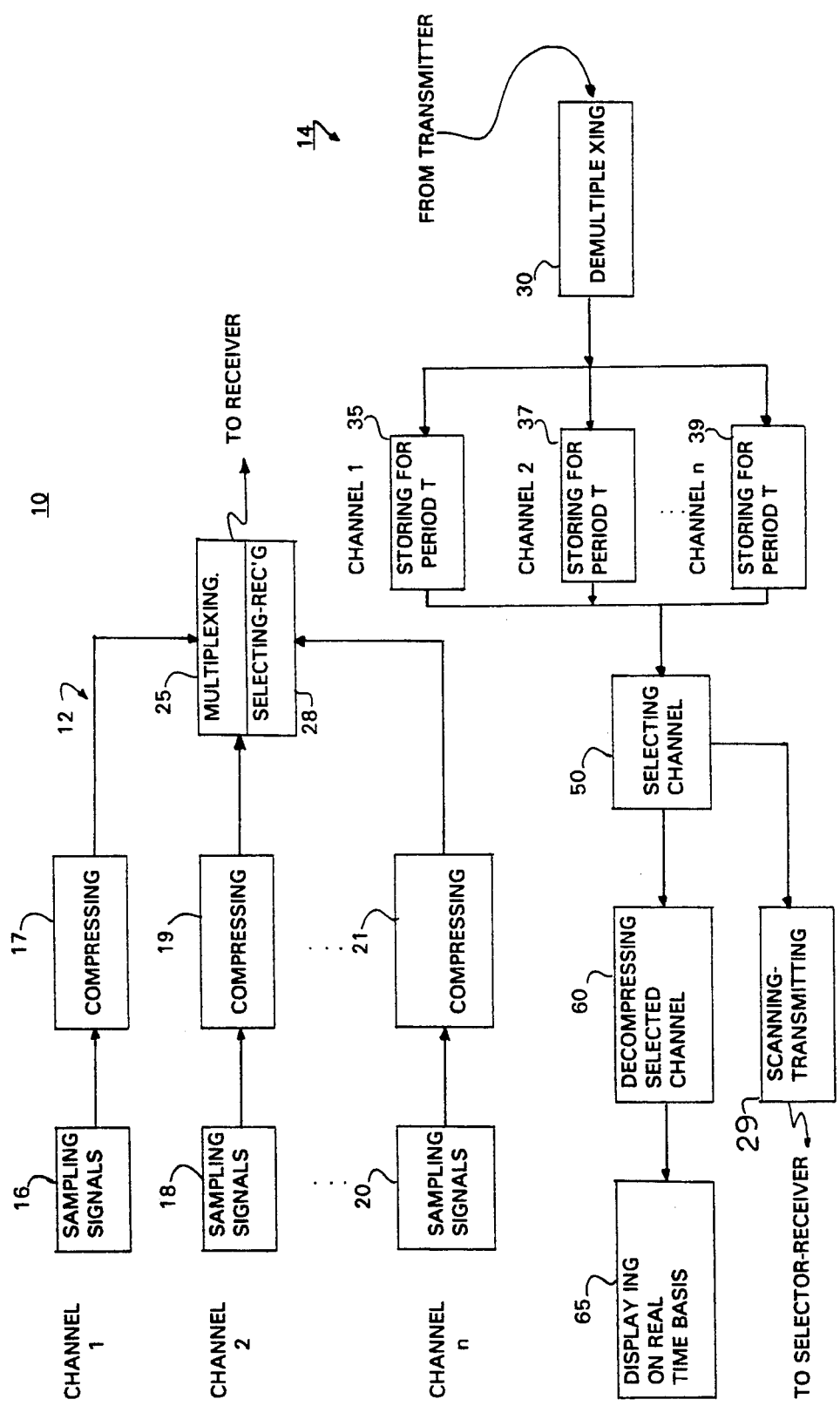
FIG. 6 is a block diagram of another method for broadcasting and receiving TV signals according to the present invention.
Figure 8:
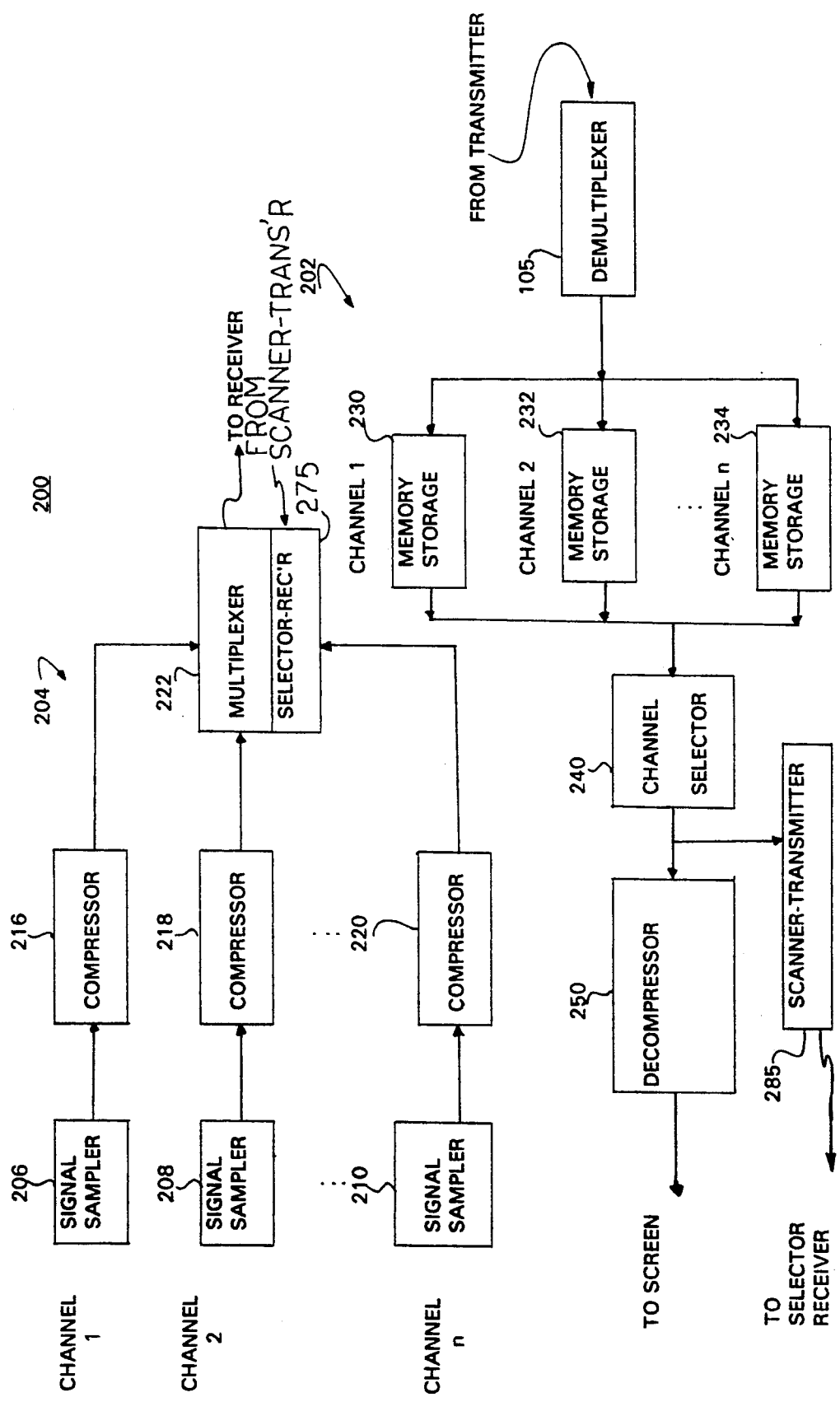
FIG. 8 is a block diagram of another TV broadcasting and reception apparatus which is constructed in accordance with the present invention, for implementing the broadcasting process of FIG. 6.

The alternate broadcasting method 12 of FIG. 6 includes identifying the channels that have been selected by the user at the receiver level 202, and then feeding this information back to the transmitter 204 (FIG. 8). This selection information is valuable in further enhancing the broadcasting process, in that the selection information is used to select which of the channels 1 through n will be transmitted.

Hence, instead of transmitting all the channels 1 through n, only those channels which the user wishes to view are selected and then transmitted. In this manner, the efficiency of the preferred broadcasting method illustrated in FIG. 1 is substantially improved.

Let us take a hypothetical example to illustrate the improvements presented by the alternate embodiment. If for instance 50 channels can be transmitted over a conventional television bandwidth, the preferred embodiment will allow the transmission of at least 100 channels, while the alternate embodiment will permit the selective transmission of over 200 channels.

It is preferable to use the alternate broadcasting method and apparatus in special applications such as satellite communications and interactive video, where the number of selected channels is limited. In case of public broadcasting, such as in regular televisions, where all or most of the channels are simultaneously selected by the viewers, the preferred embodiment of the broadcasting apparatus could be used instead.

In specialized applications however, the alternate broadcasting method and apparatus offer substantial additional advantages. Let us consider for instance satellite communications where the selection process is done periodically, automatically or selectively, the delay time t can be designed to correspond to the time it takes the feedback signal to be transmitted to, and reach the satellite so that the processor or computer on board the satellite can select the channels to be transmitted, and then transmit these channels to the exclusion of the channels that have not been selected.

In such application, video cameras can be installed in a matrix format at almost any angle around the satellite, thus capturing a three dimensional view of the surrounding space. If it is therefore desired to view selected space sectors within certain desired angles, the viewer at the receiving end simply programs the channel selector 240 to select only those video cameras or channels within the matrix of the desired viewing angles. In this manner, only the space sectors within the desired angles will be viewed.

Similarly, if the alternate broadcasting apparatus and method are used in interactive or educational video, where the viewer has the option to select from a broad range of options, then the viewer can make a selection of his or her choices, these choices are then forwarded to the transmitter and the selected choices are then displayed, while the non-selected choices would not be transmitted or displayed.

Yet another application of the alternate apparatus and method is in video recorders or VCR's, for recording multiple channels. In which case both the transmitter 204 and the receiver 202 are incorporated as part of the VCR circuitry at the user's level. When it is desired to record more than one channel, the user simply stores his or her channel selection using the channel selector 240. A scanner-transmitter 285 identifies the selected channels and transmits them via an electrical or light (i.e. infra-red) connection to a selector-receiver 275.

The selector-receiver 275 then issues a command to the signal samplers (i.e. 206, 208 and 210) for the selected channels. The signal samplers are connected to a UHF-VHF antenna (not shown) for receiving the transmitted television signals. The signals from the selected signal samplers are then compressed by the compressors (i.e. 216, 218 and 220) and then multiplexed by the multiplexer 222.

The multiplexed signals could then be recorded on regular video tapes in a compressed form, or for a better performance, these signals could be digitized and stored on tapes or in a computer memory for later retrieval. When the user wishes to view the recorded programs, he or she selects the particular channel to be viewed with the channel selector 240.

The scanner-transmitter 285 then issues a command to the selector-receiver 275 for transmitting only the selected channel to be viewed on a real-time-basis. The demultiplexer 105 then demultiplexes only that particular selected channel and transmits its signals to the corresponding memory storage (i.e. 230). The memory storage stores the signal for a period of n.(T-1), if the compressed signals of the selected channels have been substantially similar sampling periods for a period substantially equal to $$\sum_{\tau=2}^{n} Ti$$

if the compressed signals of the selected channels do not have substantially similar sampling periods, wherein n represents the number of channels that have been originally recorded or stored on tape or memory.

As illustrated in FIG. 4, the intermittent storage of the signals from the same channel is important for providing a continuous uninterrupted viewing of the signals. For instance, if the viewer wishes to record three channels, and the sampled signals from the first channel occupy a time slot T (FIG. 4), the memory storage delays the transmission of the first packet signals by a period of "3.T", until the signals from the second packet are processed. In which case, the signals from each one of the packets restored on a real-time-basis, thus achieving a continuous, uninterrupted flow of signals.

The above application can also be used in collecting data, voice, light and video signals from individual transmitter units and channel or "network" them to a single or multiple outputs. One such applications could be used in fast food restaurants or other similar restaurants, where multiple customers can place or select their orders. These orders are then distributed to various food preparers for service.

In this application, the users of the system are the patrons or customers of the restaurant, and the viewers are the food preparers who are located at a remote location from the users, and the system 200 would include a transmitter unit 204 and a plurality of substantially similar reception units or receptors 202. Some of these receptors 202 are allocated to the users and others are allocated to the viewers.

In this manner, the users or customers use the channel selector 240 to make their food selection, while the viewers or food preparers use the channel selectors 240 to view the orders. The users can then make multiple food selections while the food preparers view only their own specialized orders and identify these orders with particular customers who placed the orders. Therefore, communication between the customers and the food preparers is substantially enhanced.

Figure 7:
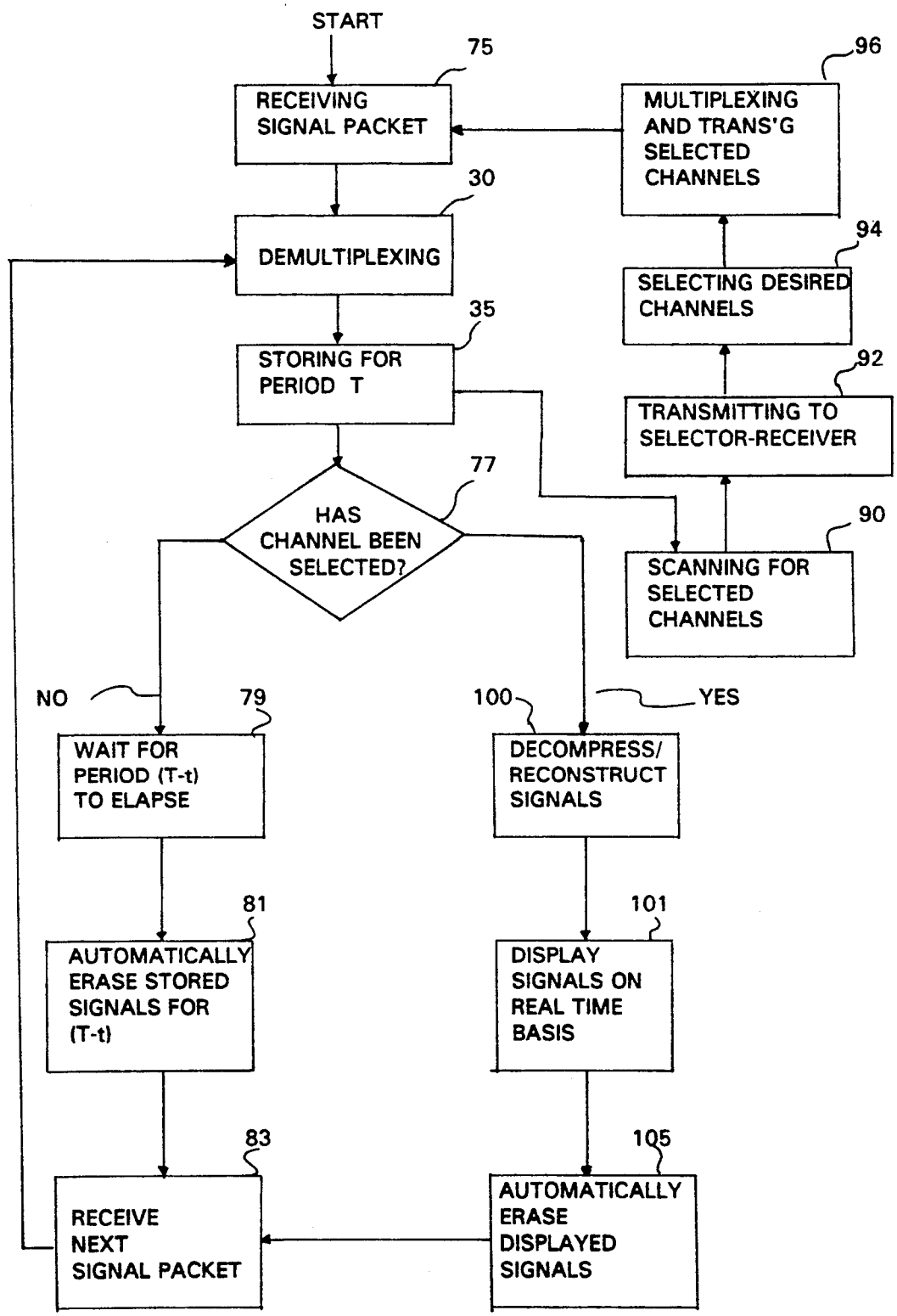
FIG. 7 is a flow chart further detailing the method for broadcasting of FIG. 6.

The alternate method 12 is illustrated in more detail in FIGS. 6 and 7. It is substantially similar to the method of the preferred embodiment, with the exception that the alternate method 12 includes the step of scanning 29 the selection process of the channels after they have been selected at 50 at the receiver level 202 (FIG. 8). Information on the selected channel, such as which channel has or has not been selected by the user, is then fed back to the transmitter 204 (FIG. 8).

The feedback process can be done in any conventional transmission method, such as over a radio or light frequencies. Lasers and infra red transmissions can also be used. The frequency of transmission should however be selected in such a way as not to interfere with the simultaneous video transmission.

I. TELECONFERENCING SYSTEM

Figure 16:
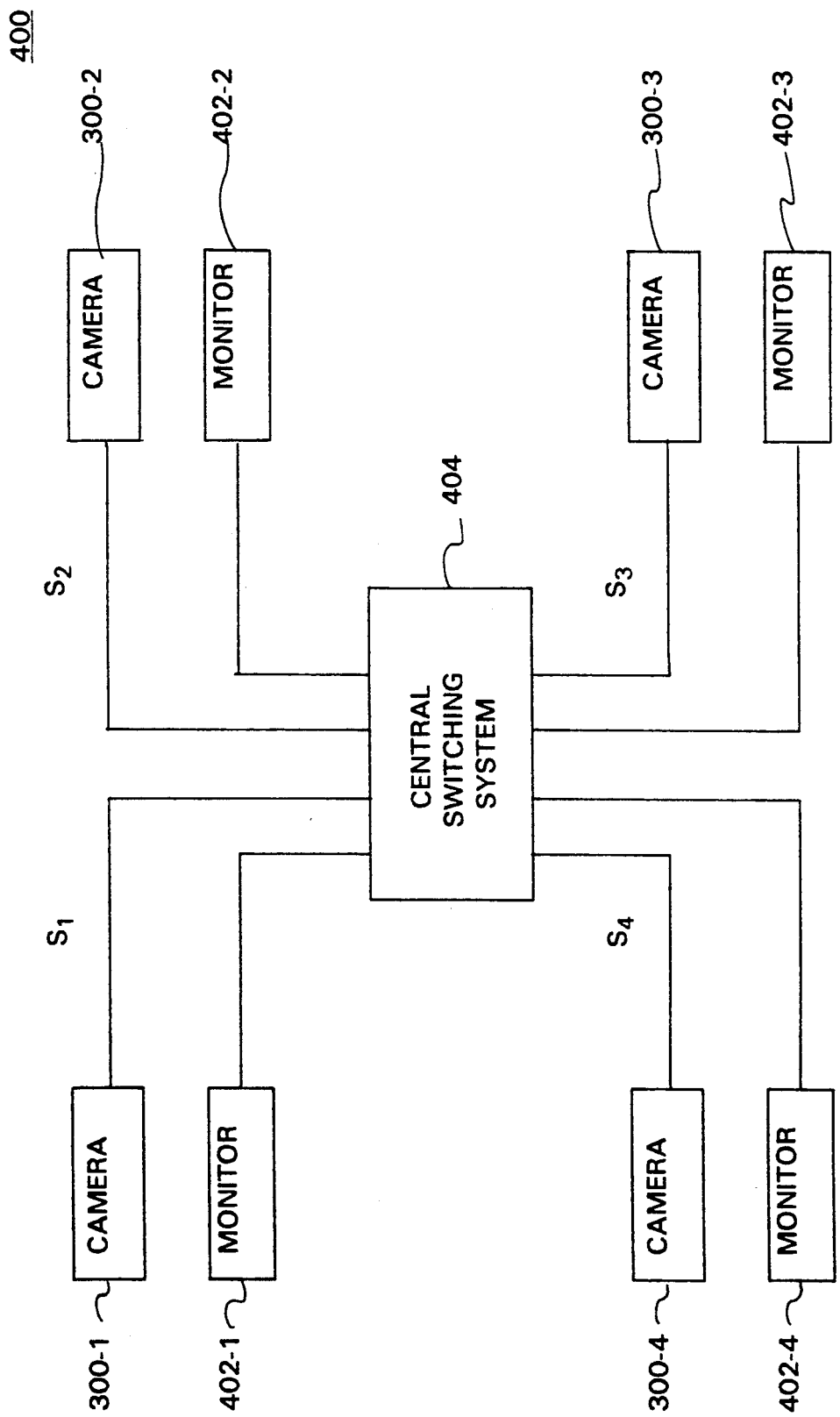
FIG. 16 illustrates a video teleconferencing system according to the following invention.

Turning now to FIG. 16, there is illustrated a video teleconferencing system 400 which permits video interaction among several remote sites. While there is illustrated only 4 conferring sites, it will be understood from the following description that other locations could also be connected to the teleconferencing system 400, and that more than a single camera could be placed at each remote location.

The teleconferencing system 400 generally includes four remotely located video cameras 300-1, 300-2, 300-3 and 300-4; four video monitors 402-1, 402-2, 402-3 and 402-4; and a central switching system 404. The cameras transmit the signals to the central switching system 404 via conventional transmission means. The central processing system 404 processes the incoming signals from the cameras and then sends the processed signals to the monitors at the remote locations.

The cameras 300-1, 300-2, 300-3 and 300-4 at the remote locations could be conventional cameras, or, in the alternative, they could be similar to the video optical system or camera 300 which will be described hereafter, in connection with FIG. 9, could be used instead. The monitors 300-1, 300-2, 300-3, and 300-4 could be conventional video monitors, or in the alternative, they could be specially designed modular monitors, as will be described below with respect to the modular liquid crystal display (LCD) monitor 700.

The central switching system 404 will now be described in greater detail in connection with the comparator system 450 shown in FIG. 17, and the broadcasting system 200 shown in FIG. 8. It will be understood to those skilled in the art, after reviewing the present description that the comparator system 450 could be either located at the remote site, as part of the camera 300, or as part of the central switching system 404.

Figure 17:
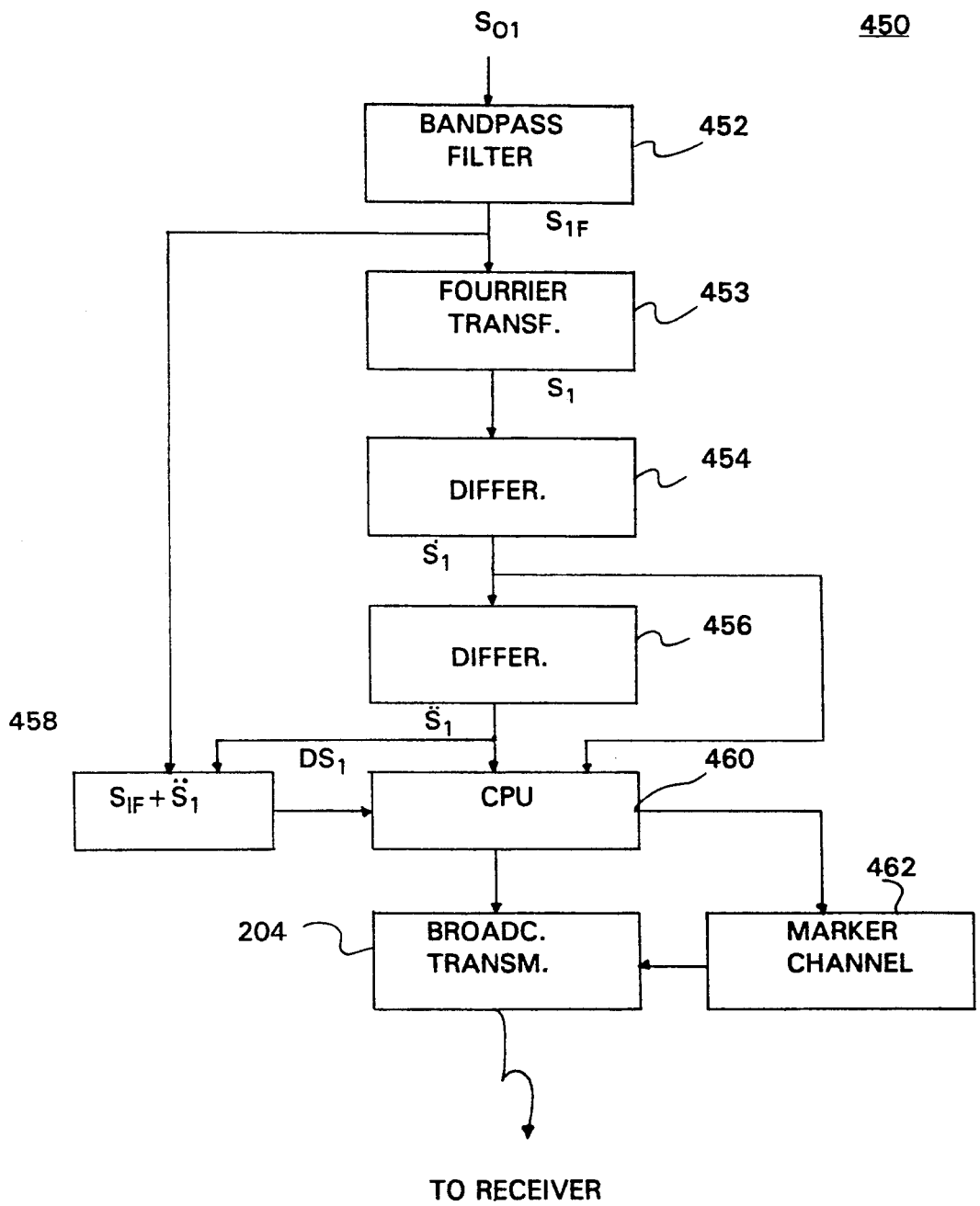
FIG. 17 is a block diagram of a comparator system constructed according to the present invention for use with the video teleconferencing system of FIG. 16 and the video optical system of FIG. 9.

In the preferred embodiment, the comparator system 450 is part of the central switching system 404, and the initial signal Sol in FIG. 17 is the signal Voc (FIG. 9) at the output of the camera 300. It should however be understood that the signal Sol could be any one of the signals Vb, Vr or Vg, or the modulated signals thereof, as illustrated in FIG. 9.

The signal Sol is filtered by the band-pass filter 452, in a first attempt to filter out noise and undesirable signals. The filtered signal Slf is then passed through a Fourier transformer 452, for generating Fourier transforms sinusoidal signals, which are then limited to the most desirable transform signals S1.

The signal S1 is then passed through a series of differentiators 454 and 456, for generating a first and a second differential signals dS1/dt and ddS1/ddt respectively. An adder 458 then adds the filtered signal Slf and the second differential signal ddS1/ddt to generate the signal DS1, such that DS1=Slf+k.dds1/ddt, where k is a coefficient resulting from the double differentiation of the signal Slf. Since the signal S1 is a sinusoidal signal, then the second differential signal ddS1/ddt is equal to (−k.Slf).

This signal DS1 can be of use in certain circumstances, and it is one object of the present invention to have this DS1 signal processed independently from the sinusoidal signal S1. For this purpose, the signals ddS1/ddt, DS1 and dS1/dt are sent to a central processing unit (CPU) 460 for processing. The CPU can be programmed to determine whether the DS1 signal is needed, and if it is not, then the signal DS1 is discarded and only the sinusoidal signal S1 is used as the final signal. If the DS1 signal is needed, then both the DS1 and S1 signals will be sampled by the signal sampler 206 (FIG. 8) and processed by the broadcasting system 200, as described above.

If the CPU 460 determines that the differential signal dS1/dt is equal to zero, then it sets a flag, at the marker circuit 462, instructing the transmitter 204 not to set a marker indicator and not to sample the corresponding signal S1, since the signal S1 has not changed from the template signal (i.e. the previous sampled signal S1). In this manner, if the camera 300 is taking a picture of an unchanging background scene, for instance a document, then it would not be necessary to sample the new signal S1. This will allow for a better efficiency and faster processing of the signals.

If on the other hand, the signal dS1/dt is different than zero, then the CPU 460 instructs the transmitter 204 to sample the signal S1, and possibly DS1, and to process the same as described above in connection with the broadcasting system 200.

The above process permits the reduction in noise and other undesirable frequencies by transmitting only the sinusoidal signals. A system similar to the system 450 can be used at the receiving end of the broadcasting system 200 to regenerate the original signal Sol.

Returning now to the teleconferencing system 400 of FIG. 16, the video signals S1, S2, S3 and S4 are processed according to the teachings of the broadcasting method 10 of FIGS. 1 and 6 and then sent back to the video monitors 402-1, 400-2, 400-3, and 400-4.

II. VIDEO CAMERAS

Figure 9:
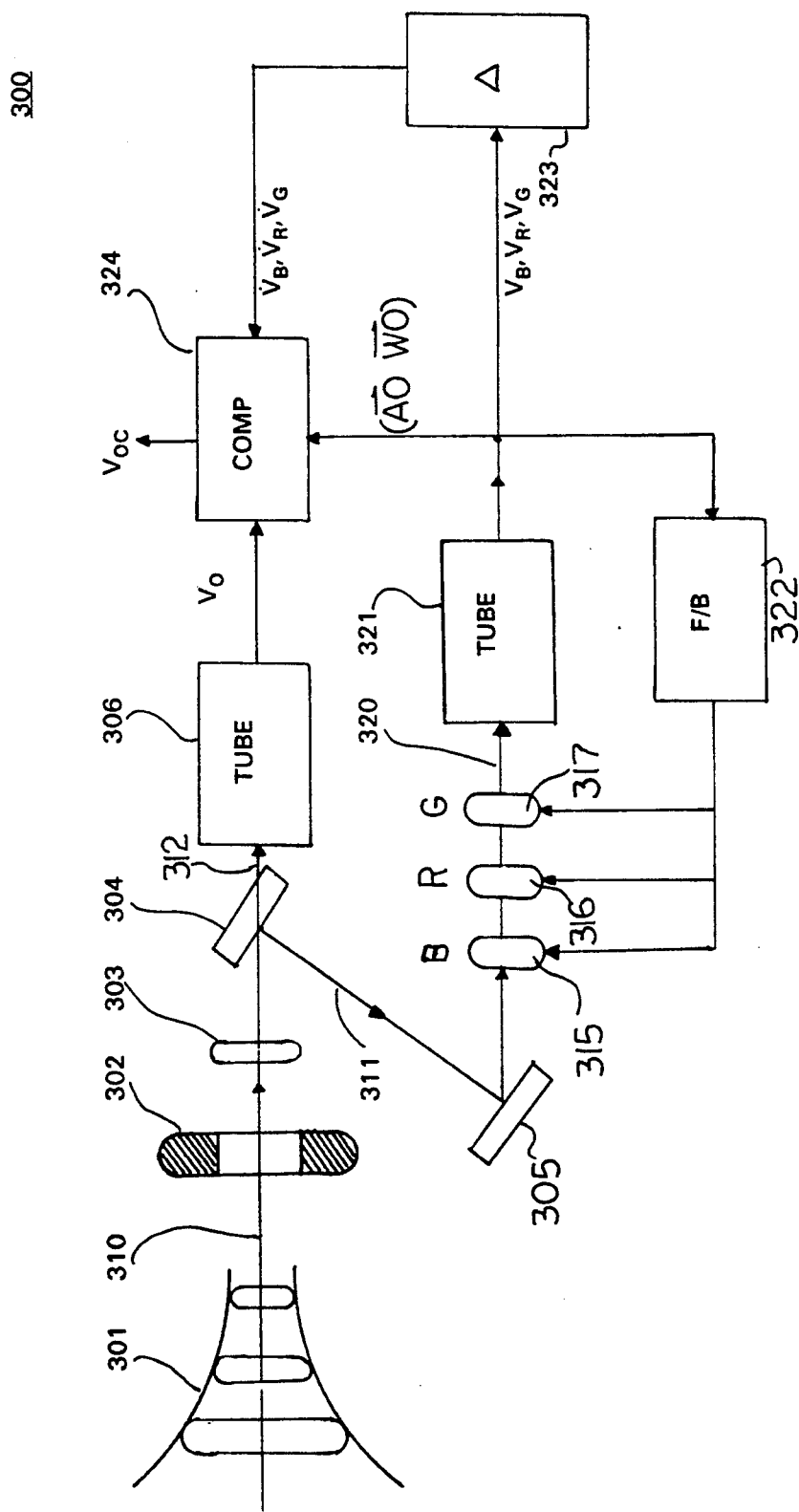
FIG. 9 is a simplified block diagram of an video optical system for use in a video camera, according to the present invention.

Turning now to FIG. 9, there is illustrated an optical system or a video camera 300. A taking zoom lens 301 focuses and conducts the impinging light rays or beam to a field lens with mask 302, along a path 310. The light rays then pass through a relay lens 303, and thereafter to a splitter 304 to be split along two paths 311 and 312. A pickup tube 306 receives the light beam along the path 312, and converts the light signal into an electrical signal Vo.

A mirror 305 reflects the light beam incoming along path 311 through three rotational blue, red and green discs or color lens systems 315, 316 and 317 respectively. Each one of these color lens systems 315, 316 and 316 (FIG. 10) rotates at an angular speed (Wb, Wr, Wg) proportional to the frequency of its corresponding color, for achieving four purposes. The first is to filter and sample the incoming light signal; the second is to obtain three derivatives of the signal with respect to the frequencies of the red, green and blue colors; the third is to mix these derived signals to get the resulting color frequency; and the fourth is to determine the intensity or amplitude of this resulting color frequency.

Each color lens system, such as the blue lens system 315, has a plurality of adjustable shutters 315A, 315B and 315C. As it will be explained later in greater detail, the opening of each shutter reflects the amplitude of the corresponding impinging filtered light signal, i.e. the blue light signal. As a result, the color lens systems 315, 316 and 317 provide information relating to the amplitude of the sampled signals, which are split without the use of conventional color splitters.

The split light beams exit the color lens systems 315, 316 and 317 along a path 320, and emerge onto a pickup tube 321, which receives the split color light beams and converts them into electrical signals Vb, Vr and Vg.

These signals Vb, Vr and Vg are simultaneously transmitted to a feedback system 322, to a differentiator circuit 323 and to a comparator/corrector 324. The feedback system 322 sends the signals Vb, Vr and Vg to the corresponding color lens systems 315, 316 and 317 respectively, to cause the shutters in each one of these lens systems to open up or to close proportionally to the amplitude of the corresponding signal, that is the amplitudes of the signals Vb, Vr and Vg.

The differentiator 323 differentiates the color signals Vb, Vr and Vg with respect to time and transmit the differentiated signals to a comparator/corrector 324, which compares the signal Vo to each of the differentiated color signals dVb/dt, dVr/dt and dVg/dt, according to the following equations:

$$Vo + (ddVb/ddt + ddVr/ddt) = Vgc; \quad (1)$$

$$Vo - (ddVb/ddt + ddVg/ddt) = Vbc; \quad (2)$$

$$Vo - (ddVr/ddt + ddVg/ddt) = Vrc; \quad (3)$$

$$Voc = Vbc + Vrc + Vgc, \quad (4)$$

where Voc is the corrected output of the optical system 300; Vbc is the corrected blue light signal; Vrc is the corrected red light signal; and Vgc is the corrected green light signal.

Thus, since no color splitters have been used to split the incoming light beam, the intensity of the light beam is not diminished, therefore allowing for a better color resolution even in dimly lit places. The light path 310 could be a fiber optic, which allows the placement of the color lens systems 315, 316 and 317.

Considering now the lens systems 315, 316 and 317 in greater detail in connection with FIG. 10. These lens systems are generally similar in structure, and therefore, only the lens system 315 will be described hereinafter in greater detail. The blue lens system 315 includes three adjustable shutters 315A, 15B and 315C, whose adjusting mechanism (not shown) is coupled to the feedback system 322, for controlling and adjusting the opening of these shutters 315A, 315B and 315C.

In the preferred embodiment, the blue lens system 315 has a generally circular periphery, and the shutters, such as the shutter 315A are pie-shaped, and are designed to rotate around the central axis of symmetry of the lens in the direction of the arrows A and A' In this manner, the rate of change of the shutter opening is proportional to the arc 315H and hence to the central angle 315G. The feedback system 322 correlates the angular velocity of the blue lens system 315 to the shutter's central angle of opening, thus providing an additional degree of freedom for the movement of the lens.

If for instance, the change in amplitude is too large for the feedback system to mechanically control the opening of the shutter 315A which reaches its maximum opening limits, the feedback system 322 can control the angular velocity of the blue lens system 315 to make up for the mechanical limitations of the shutter 315A. In the above example, the angular velocity Wb is decrementally reduced to the next lower angular speed or even to a lower angular speed, such that Wb remains proportional to the frequency of the blue light. The correlation between the angular speed Wb, the central angle 315G and the signal amplitudes is calculated and implemented by the feedback system 322, which uses a central processing unit CPU, not shown.

Each shutter, such as the shutter 315A, can be adjusted independently from the other shutters 315B and 315C. It should however be understood that all three shutters can be synchronized and adjusted by the same angular adjustment, or by an angular adjustment proportional to the respective color frequencies.

Turning now to FIGS. 11 and 12, there is illustrated two enlarged top and side views of the blue lens system 315 along the line K—K. The blue lens system 315 includes a shutter section 330 and a lens section 333 which are generally superposed. Both the lens section 333 and the shutter section 330 rotate about the central axis of symmetry 334.

Considering now the lens section 333, it generally includes a single disc, which accommodates three pie-shaped, generally similarly designed blue filter lenses 335, 336 and 337, which are alternately separated by three transparent sections 338, 339 and 340. Thus, the impinging light is allowed to pass through and be filtered by, the filter lenses 335, 336 and 337, and also to pass, unfiltered, through the transparent sections 338, 339 and 340. Each lens system can have only one lens and one shutter.

The shutter section 330 is superposed atop, or, in the alternative, below, the lens section 333, to block the passage of the impinging light beam along the path 310, and to allow its passage through the transparent sections 338, 339 and 340, and in selected sections of the lenses 335, 336 and 337. Thus, the shutter section 330 includes a disc which accommodates the three opaque shutters 315A, 315B and 315C, which are alternately separated by three transparent sections 340, 343 and 343.

As illustrated in FIG. 11, the shutter section 330 partially covers the lens section 333 to allow for a partial passage and filtering of the light beam through the filter lenses 335, 336 and 337. During the next cycle, when the blue lens system 315 is rotated by 360 degrees, the opaque shutter 315A can be rotated clockwise or counterclockwise, in the direction of the arrow A' or A respectively, to either decrease or increase the amount of light passing through the lens 335.

It should also be understood that a correcting filter section, not shown, could also be added as yet another section, below the lens section 333 to further correct the blue color filtering. This correcting blue filter section is similarly designed to, and is caused to rotate in coordination with, the blue lens section 333. Other correcting red and green filter sections can be similarly added to the respective red and green lens sections.

As described above, the angular rotation Wb of the blue lens system 315 is proportional to the blue light frequency, while the opening of the shutter 315A is a function of, or proportional to, the amplitude of the preceding blue signal. In the preferred embodiment, each sampled signal operates as a template for the next signal. Thus, the opening of the shutter 315B is a function of the amplitude of the signal allowed to pass, i.e. sampled by, the shutter 315A.

In the alternative, the adjustment of the shutter opening is made as a function of, or proportional to, the difference in amplitude between the previous two signals of the same color. For example, the opening of the shutter 315C is made as a function of the difference in signal between the amplitudes of the two blue signals sampled by the shutters 315A and 315B, that is as a function of the difference in the actual openings of the shutters 315A and 315B.

It should be understood that while the shutters 315A, 315B and 315C can be adjusted to have the same openings in any one cycle, the preferred embodiment allows for independent shutter openings, that is the feedback system 322 controls the shutters 315A, 315B and 315C independently.

As it has become clear from the above description, the amplitude of the signal (or shutter opening) is a function of the differential signal of the same color with respect to time. Consequently, the blue lens system 315 simultaneously provides for a differential of the sampled signals, both with respect to time using the shutters 315A, 315B and 315C, and also with respect to the angular velocity of the lens system 315 itself. Each one of these two differential signals serves a different function, as will be described below.

Conventionally, a color picture is produced on the television monitor by juxtaposing the green, red and blue pixels next to one another to produce the desired final color. The light spectrum is treated as a linear spectrum where the colors change frequencies from one end of the spectrum to another.

The present invention describes a novel three dimensional frequency spectrum, with an application relating to the present invention, and with prospective applications relating to laser monochromatic (hologramic) imaging, three dimensional television and single pixel television monitors (as opposed to the conventional three-pixel screen).

Figure 14:
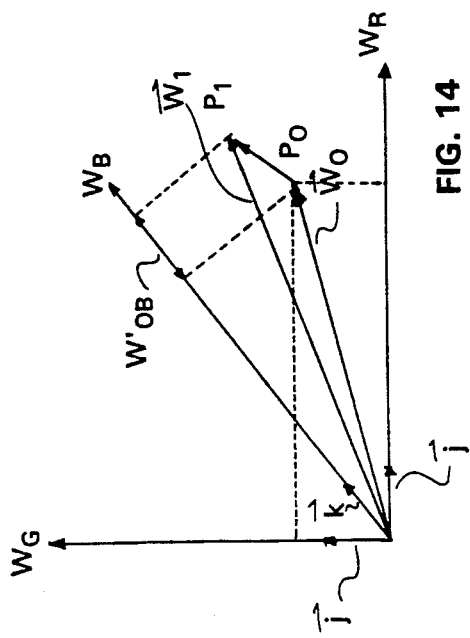
FIG. 14 is a three-dimensional coordinates system and a vectorial representation of a three dimensional frequency color spectrum according to the present invention, for use in the video optical system of FIG. 9.

FIG. 14 illustrates a three-dimensional coordinates system and a vectorial representation of the new three dimensional color spectrum. The vectorial units i, j and k are not necessarily equal. In the preferred embodiment, these vectorial units are proportional to the color frequencies they are associated with. For instance, the magnitude or value of the vectorial unit i is proportional to the frequency of the red color. In this manner, the three dimensional output vector Wo is equal to the vectorial sum of the blue, red and green vector components as indicated in the following equation, where Wo, i, j and k are vectors:

$$Wo = Wr.i + Wg.j + Wb.k. \quad (5)$$

In this equation, Wr, Wg and Wb represent the angular speeds of the lens systems 316, 317 and 315 respectively. Therefore, the absolute value of the resulting output vector Wo represents the frequency of the final mixed color, such as yellow. The resulting vector is periodically calculated.

The next three dimensional output vector W1 is calculated as follows:

$$W1 = Wo + W'o, \quad (6)$$

where W'o is the is vectorial shifting, along the three dimensional color spectrum. The vector W'o has three B, R and G components W'ob, W'or and W'og respectively. Each one of these components is calculated as follows:

$$W'ob = W'b / Fb, \quad (7)$$

$$W'or = W'r / Fr \text{ and} \quad (8)$$

$$W'og = W'g / Fg. \quad (9)$$

In the above equations, Fb, Fr and Fg are the respective selected frequencies of the blue, red and green lights respectively. W'b, W'r and W'g are differential values, with respect to the blue, red and green color frequencies respectively, of the impinging light signal. These differential values W'b, W'r and W'g are reflected by the differences in the angular speed of the blue lens system 315, red lens system 316 and the green lens system 317 respectively. As described above, the feedback system 322 controls the angular rotation of the lens systems 315, 316 and 317, as a result of the signals Vb, Vr and Vg from the pickup tube 321.

Hence, the B, R and G components W'ob, W'or and W'og are measured by calculating the angular speed differences between two sampling events. For example, if the angular speed of the blue lens system 315 has not changed between two sampling events, i.e. the angular speed Wb remains unchanged, then the B component Wob of the vector W'o is equal to zero. If on the other hand, the angular speed Wb changes, it does so in proportion to the frequency of the blue light.

The above description on how to measure the vectorial frequency shift is an important aspect of the present invention in that enables to locate the frequency of any changing colors in the impinging light ray, within the three dimensional light spectrum.

To better explain the results achieved by this inventive process, it should be explained that the scenes captured by the camera 300 are generally composed of a background and of a moving character, such as a moving train. A scene as defined herein is composed of a series of frames with a generally similar background. If the background changes, the scene is said to have changed.

Let us take for instance an unchanging or fixed background (i.e. a building), and let us consider that a train or some other character (i.e. an animal or a person) is expected to enter the scene after a few frames. While the camera is shooting the fixed background, the pickup tube 306 captures the background scene, and the signals Vbc, Vrc and Vgc as well as the vector Wo are used to enhance the background colors captured by the pickup tube 306. The background colors remain unchanged for several frames until the entering of the character into the scene. The unchanged background colors are reflected by the fact that the components W'b, W'r and W'g are equal to zero. When the moving character enters the scene, the components W'b, W'r and W'g change according to the colors of this character.

Thus, if the original color of the particular location of the background is pink and the character color is blue, the mixture of the components W'b, W'r and W'g changes are reflected by corresponding changes in the angular speeds of the lens systems 315, 316 and 317.

It will be understood to those skilled in the art after reviewing the present description that the angular speeds Wb, Wr and Wg of the lens systems 315, 316 and 317 can be simultaneously synchronized with the speed of the frame processing as well as with the frequencies of the respective light colors.

It will also be understood that the pickup tube 306 can be replaced by a conventional camera, and that the mirror 305, the lens systems 315, 316, 317, the pickup tube 321, the feedback system 322, the differentiator 323, and the comparator/corrector 324 can be added to a conventional camera to enhance its imaging processing capability.

Figure 15:
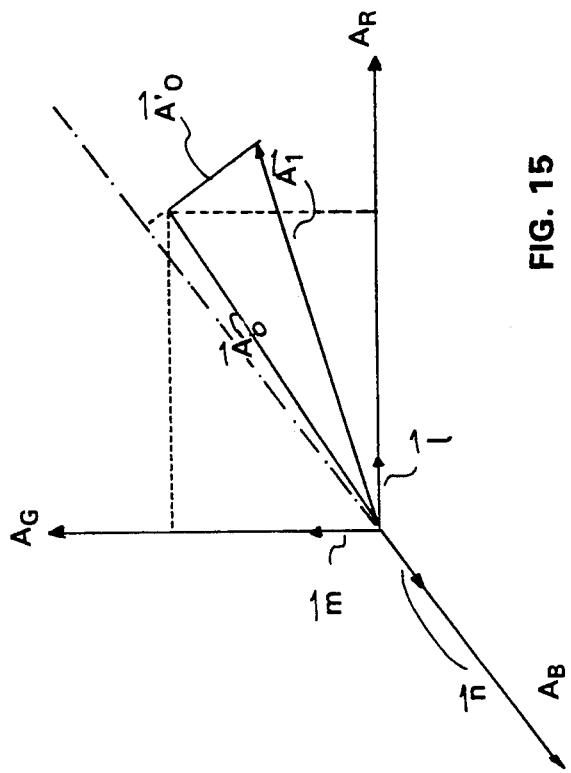
FIG. 15 is another three-dimensional coordinates system and a vectorial representation of a three amplitude dimensional color spectrum according to the present invention, for use in the video optical system of FIG. 9.

It therefore remains to determine the intensity or brightness of the colors exiting the lens systems 315, 316 and 317. FIG. 15 illustrates a three-dimensional coordinates system and a vectorial representation of the new three dimensional color spectrum. The vectorial units 1, m and n are equal unitary vectors. The components of the resulting amplitude vector Ao are represented by the values Ab, Ar and Ag, which coincide with, or are proportional to, the openings of the B, R and G shutters 315A, 316A and 317A respectively, and thus they are proportional to the angles 315G, 316G and 317G through which the impinging light beam passes.

In this manner, the three dimensional output vector Ao is equal to the vectorial sum of the blue, red and green vector components as indicated in the following equation, where Ao, k, 1 and m are vectors:

$$Ao = Ar.l + Ag.m + Ab.n. \quad (10)$$

Therefore, the absolute value of the resulting output vector Ao represents the intensity of the final mixed color.

As with the resulting vector Wo, the resulting vector Ao is periodically calculated.

The subsequent three dimensional output vector Al is calculated as follows:

$$Al = Ao + A'o. \quad (11)$$

where A'o is the vectorial shifting, along the three dimensional coordinates (FIG. 15) of the color spectrum. The vector A'o has three B, R and G components A'ob, A'or, and A'og respectively. Each one of these components is calculated as follows:

$$Aob = A'b, \quad (12)$$

$$Aor = A'r, \text{ and} \quad (13)$$

$$Aog = A'g. \quad (14)$$

In the above equations A'b, A'r and A'g are differential values, reflected by the variations in the shutters openings. Hence, the B, R and G components A'ob, A'or and A'og are measured by calculating the difference between two consecutive openings of the shutters.

The above description on how to measure the vectorial amplitude shift is an important aspect of the present invention in that it enables to locate the amplitude of any changing colors in the impinging light ray, within the three dimensional light spectrum.

Knowing the frequency and intensity of the final resulting signal, this signal could be reconstructed and then transmitted to a single frequency-sensitive pixel, as opposed to the conventional three-pixel system. As a result, the resolution of the television monitor is improved substantially.

Let us consider the three dimensional light spectrum in greater detail. In a conventional linear light spectrum colors have been assigned a particular range of frequencies of for that matter wavelengths, as follows:

Violet: 3,800 to 4,500 Angstroms;
Blue: 4,500 to 5,000 Angstroms;
Green: 5,000 to 5,800 Angstroms;
Yellow: 5,800 to 5,950 Angstroms;
Orange: 5,950 to 6,200 Angstroms; and
Red: 6,200 to 7,675 Angstroms.

In the present three dimensional light spectrum, three color frequencies, such as blue, red and green are selected as the three basic colors from which other colors can be reproduced, similar to conventional mixing methods. In the present invention however, the blue color can be assigned a single reference wavelength such as 4,750 Angstroms=[C / Fb], where C is the speed of light); the red color can be assigned another single reference wavelength such as 7,000 Angstroms=[C / Fr]; and the green color can be assigned yet another single reference wavelength such as 5,500 Angstroms=[C / Fg].

As described above, the unitary vectors i, j and k, would then have an absolute value of 7,000 Angstroms, 5,500 Angstroms and 4,750 Angstroms respectively. The resulting Wo would then be expressed in terms of these unitary vectors as indicated in equation (5).

Consequently, it would not be necessary to mix the colors, since the final or resulting frequency can be expressed as a function of the three coordinate frequencies, but rather calculate the resulting frequency and then reproduce it.

It will be understood that other color frequencies can be selected to be the reference frequencies in the three dimensional spectrum. It should also be understood that two three dimensional spectra can be used, each having different reference frequencies, and that the second spectrum can be used as a parity check, in order to ascertain that accuracy of the resulting colors using the first spectrum. In case of disparity between the first and second resulting colors, conventional methods can be used to approximate the final color.

In certain instances, such as in cameras used in the photography of celestial bodies, it will be important to also capture the infra-red and ultra-violet rays. The present three dimensional light spectrum can be extended to cover the infra-red and ultra-violet frequency ranges as well.

Returning now to FIG. 9, a single ray of light enters and is processed by the three lens systems 315, 316 and 317. In certain instances, the light ray passes simultaneously through the filter lenses of the lens systems. Two correction possibilities are available. The first is to cause to the CPU in the feedback system 322 to ignore such overlap, since the position of the color lenses is synchronized. The second correction method is to cause the overlapping colors to be filtered out by the corresponding correcting filters.

While the invention is described herein in connection with a rotating lens systems, it should be understood that other non mechanical devices are contemplated by the invention and achieve similar results.

Considering now equations (1), (2) and (3), since the incoming light beam includes a sinusoidal component (i.e. Vr), a double differentiation of these components (i.e. ddVr/ddt) would result in the negative of the original components (i.e. −Vr), and thus the original component nullifies its double differentiated signal when both signals are added together.

Consequently, since the original Vo includes three B, R and G components, Vob, Vor and Vog, equations (1), (2) and (3) can be used to correct the Vo signal. Additionally the vector pair (Wo,Ao) can be used to correct the signal Vo.

Figure 13:
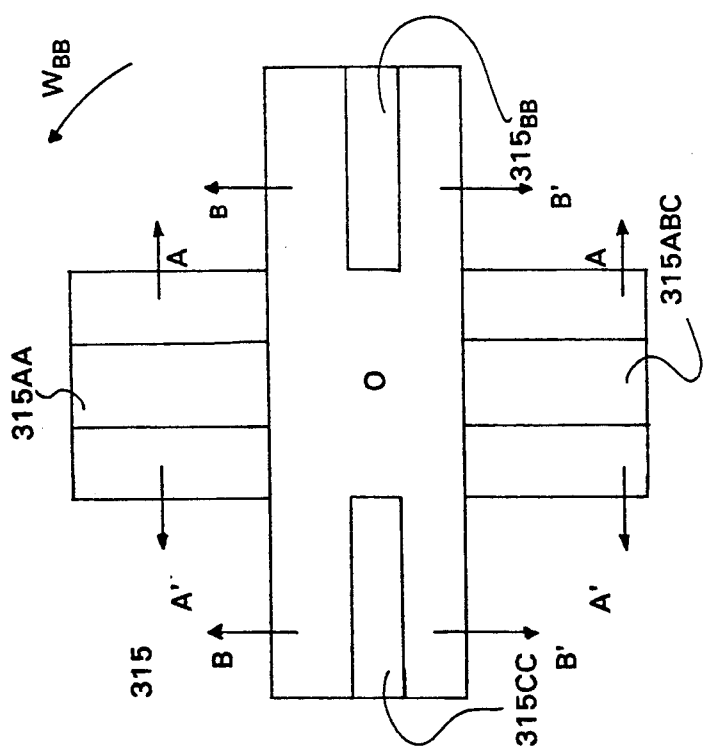
FIG. 13 illustrates another embodiment of the lens system of FIG. 11.

FIG. 13 illustrates another embodiment for the lens system 315, which uses a generally rectangular lens 315AA instead of the pie-shaped lens of the lens system 315. The two crossed sections containing the lenses are vibrated in the directions of the arrows AA and BB to open up or close the shutters, instead of using the shutter system of FIG. 11. The entire lens system is still rotated around its axis of symmetry similarly to the lens system 315, at an angular velocity of Wbb.

It should be understood that each filtered colored beam could be treated as a separate channel, and the broadcasting and modulating system described above could be used to transmit and to reconstruct the original color signals. A frequency shifter could also be added at the receiving or even the sending ends of the broadcasting system.

III. LCD MONITORS

Figure 18:
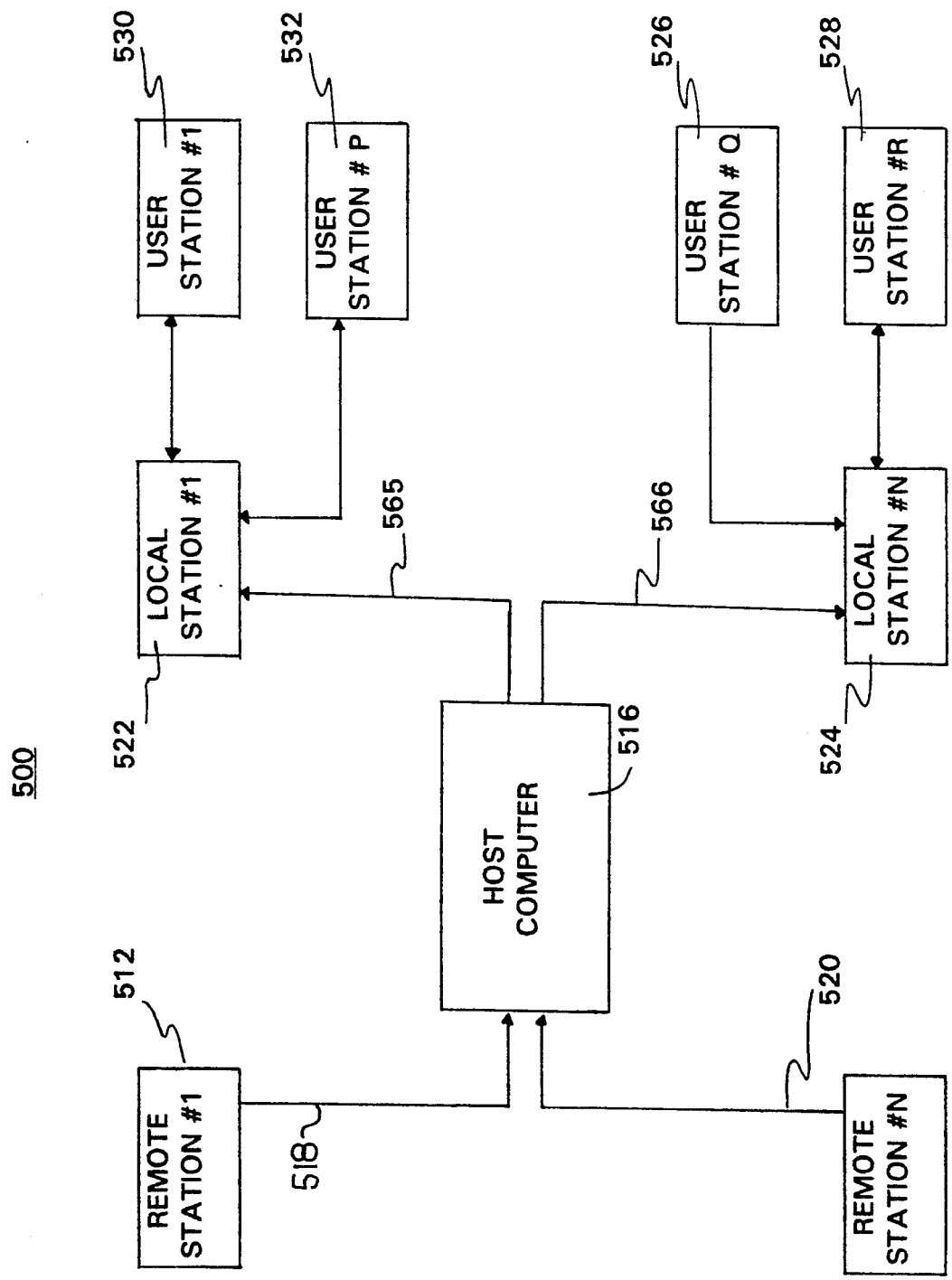
FIG. 18 illustrates a block diagram of a paperless publication network in accordance to the present invention.

Referring now to the drawings and more particularly to FIG. 18 thereof, there is illustrated a block diagram of a paperless network 500 in accordance to the present invention. The network 500 generally includes a plurality of remote stations, such as the remote stations 512 and 514, a plurality of local stations 522 and 524, and a plurality of user stations 526, 528, 530 and 532.

At the local stations 522 and 524, the information is accessed by the users or subscribers through dedicated user stations, such as the user stations 526, 528, 530 and 532. While only the user stations 530 and 532 are illustrated in conjunction with the local station 522, it should be understood that more than two user stations can be used in conjunction with either one of the local stations 522 and 524.

Figure 20:
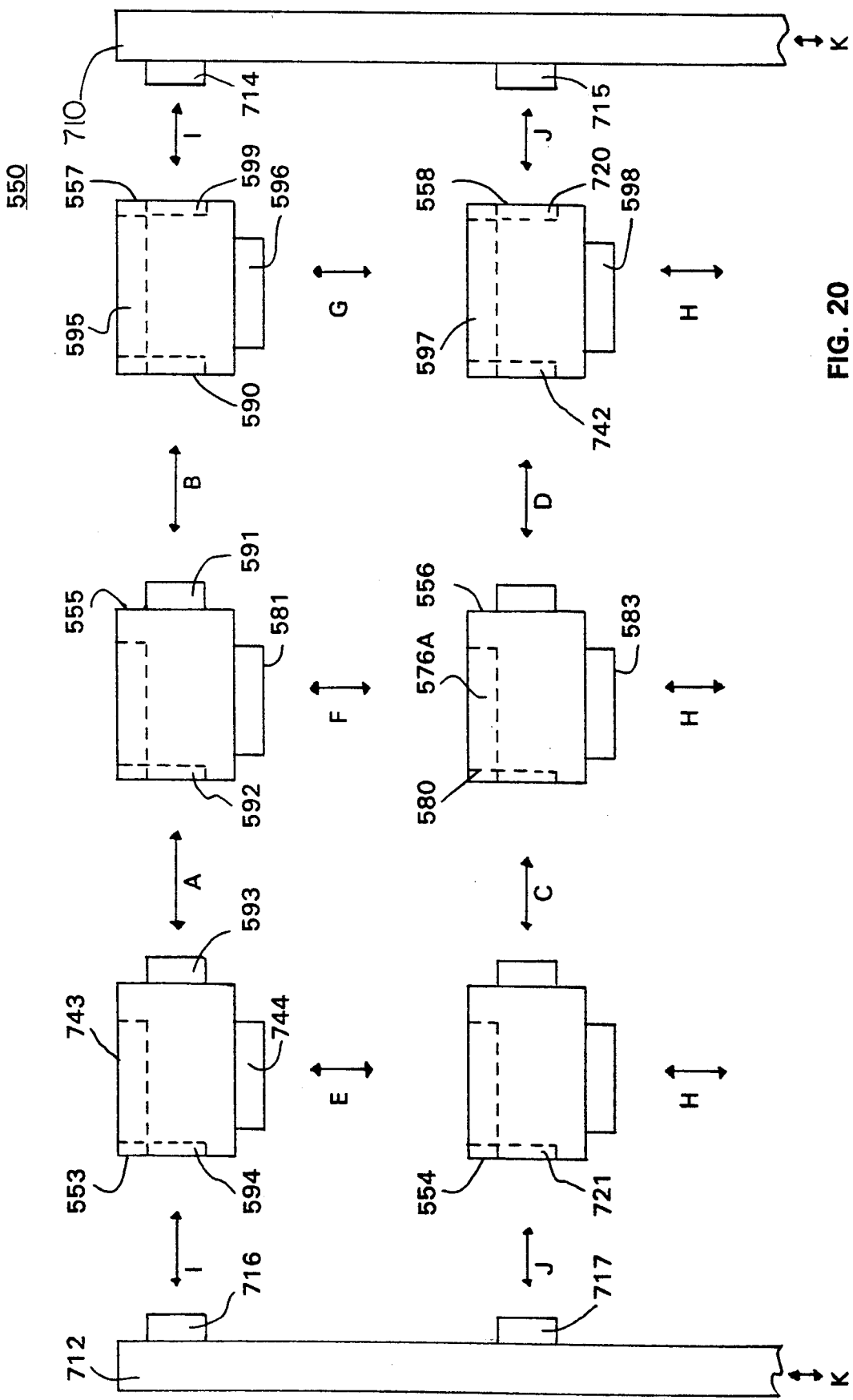
FIG. 20 is a graphical representation of a plurality of screen modules and two lateral buttresses which are interengageable and disengageable to form the modular monitor of FIG. 21, and for use in the teleconferencing system of FIG. 16 and the paperless publication network of FIG. 18.
Figure 21:
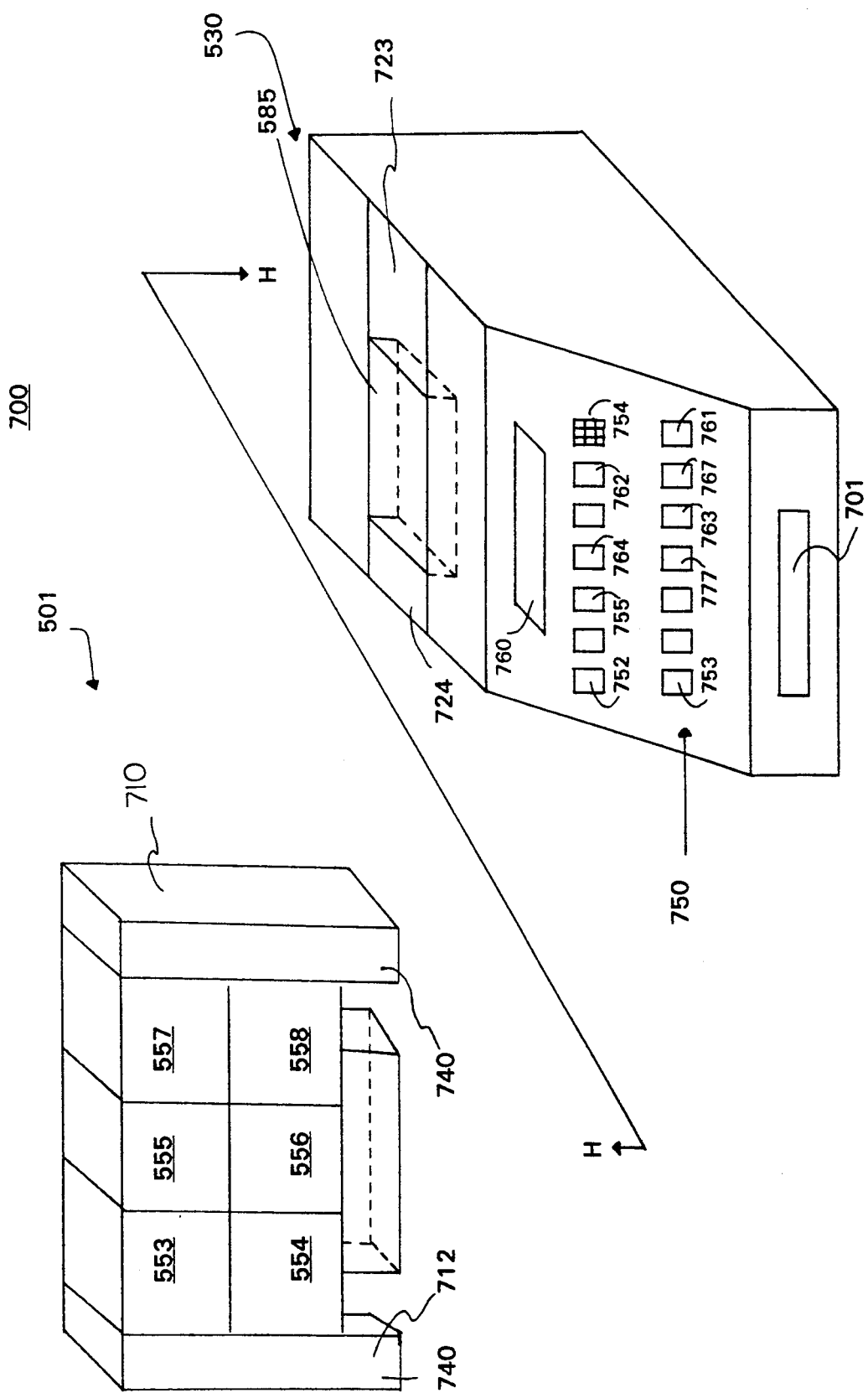
FIG. 21 is a perspective view of the modular monitor referred to, above, in the description of FIGS. 19 and 20.

FIGS. 20 and 21 illustrate a modular screen 550, which is interconnectable to the user station 530 to form a monitor 700. The screen 550 includes a plurality of screen modules such as the modules 553, 554, 555, 556, 557 and 558, which are engageable to one another, in the direction of the arrows A, B, C, D, E, F and G, to form the screen 550. The screen 550 is engageable to the user station 530, along the arrow H, to form the monitor 700.

In operation, the user selects the number of screen modules, such as modules 553–568, he or she wishes to use, and then interconnects them to form the modular screen 501. The user then engages the screen 501 to the user station 530 to form the monitor 700. The monitor 700 can be used as a video monitor for use in the video teleconferencing network 400, as the monitor 402-1, for video imaging. In the alternative, the monitor 700 can be used with as part of the paperless dissemination network 500, for displaying texts and graphics.

Figure 19:
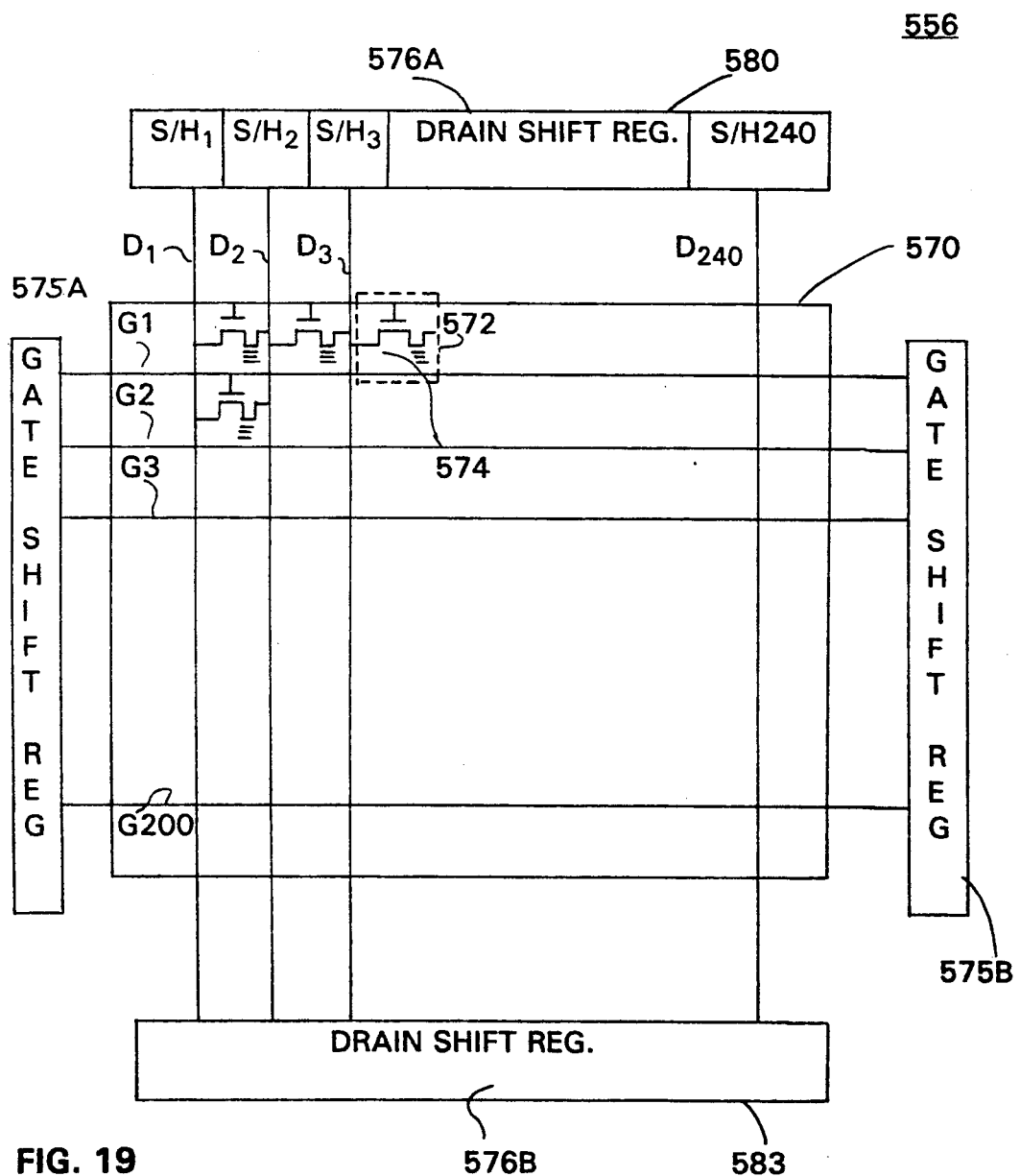
FIG. 19 is an enlarged view of the circuitry of a screen module used in a modular monitor in the paperless publication network of FIG. 18.

Considering now a representative screen module, such as the screen module 556 in greater detail with respect to FIG. 19. The module 556 includes a liquid crystal display (LCD) 570 generally known in the art. Liquid crystals have been used for optical displays. Their optical properties change considerably by application of weak electric fields. Common liquid-crystal displays operate using the twisted nematic mode (TNM). In this mode the device rotates any optical beam by 90 degrees. The application of an electrical field changes the orientation pattern of the nematic liquid and reversibly destroys this optical rotation.

The use of both monochrome and color LCD's has become popular, especially in small personal computers and portable television receivers. The LCD is formed of a plurality of units, such as the unit 572, which is shown bordered in phantom lines in FIG. 19. Each unit includes a thin-film transistor (TFT) 574.

The operation of LCD's is not limited by the high-voltage requirements of conventional CRT's. Instead, the picture raster is constructed of a rectangular MOS switching matrix of from 240 to 600 horizontal elements and from 200 to 400 vertical elements. The gates of all the thin-film transistors (TFT's) in a given horizontal row are connected to two common busses or Gate Shift Registers 575A and 575B. Likewise, the drains of the all the transistors in a vertical column are connected to two common busses or Drain Shift Registers 576A and 576B.

It is to be understood, however, that the various principles of the present invention may be employed with any of the various types of liquid crystal materials (cholesteric, nematic or smectic) or combination thereof, including combinations with dyes.

Mechanical Interconnection: The Drain Shift Register 576A is encapsulated in a protective insulation female housing 580, such as hardened plastic to provide a mechanical socket into which a male housing 581 (FIG. 20) is engaged firmly. The housing 581 is generally similar in design and construction to the male housing 583 of the module 556. The male housing 583 houses the Drain Shift Register 576B for mechanically mating with the central socket 585 of the user station 530 (FIG. 21).

In this manner, when all the selected modules are interconnected together to form the unitary screen 501, they are also interconnected to the user station 530. As result, the screen 501 becomes quite rigid in structure. Additional conventional mechanical locking devices can also be added to ensure that the screen in engageably locked in place with the use station 530.

Two oppositely located lateral connectors or buttresses 710 and 712 also engage the extremity modules 553, 554, 557 and 558, by means of male connectors 714, 715, 716 and 717, which engage the corresponding housings 599, 720, 594 and 721 respectively. Additionally, as indicated in FIG. 21, these lateral buttresses also engage the user station 530 via the lateral sockets 723 and 724. These lateral buttresses 710 and 712 serve as additional locking mechanism.

An additional top buttress, not shown, can also be added to engage the top modules 553, 555 and 557, and to similarly engage the top portions of the lateral buttresses 710 and 712.

The modules can be easily disengaged from the user station 530, from each other, and from the lateral buttresses 710 and 712, when the user wishes to store or to transport the monitor 700.

Electrical Interconnection: When the screen modules are mechanically interconnected, they also become electrically serially interconnected, in that the Gate Shift Register 590 of the module 557 will be interconnected to the Gate Shift Register 591 of the module 555, which in turn is intrinsically connected to the Gate Shift Register 592, which is connected to the Gate Shift Registers 593 and 594 of the module 553. In this manner, when the modules 553, 555 and 557 are engaged to one another, their gates would also become serially interconnected, as if they were a single module.

The Gate Shift Registers are electrically interconnected to the lateral sockets 723 and 724 of the user station 530, and are connected to each other in series, by means of the lateral buttresses 710 and 712. This interconnection can be implemented by electrically interconnecting only one Gate Shift Register, such as 599, in a horizontal row, to the corresponding protruding male connector 714 of the lateral buttress 710. Similarly, the Gate Shift Register 720, in a second horizontal row, is electrically interconnected to the corresponding protruding male connector 720 of the lateral buttress 710.

In the alternative, the male connectors 716 and 717 of the opposite lateral buttress 712 could also be interconnected to the Gate Shift Registers.

Each buttress 710 and 712 includes a bottom portion 740 and 741 respectively, which engages the corresponding lateral socket 723 and 724 respectively. In this manner, when the six modules 553-558 and the two lateral buttresses 710 and 712 are interengaged, the screen modules are expanded serially and form the unitary screen 501 which is, not only mechanically rigid, but which electrically operates as a single larger module. It should however be understood that each module can be operated independently from one another as if each module were an independent screen.

The user station 530 is therefore electrically interconnected to all the modules of the modular screen 501. The modules are also identified on a matrix basis, such that the user station can be selectively connected to one or more screens, at the will of the user.

For instance, the user can access and activate the modules 553, 556 and 557, and not activate the remaining modules. This simulated split screen feature has several applications, and enables the software program which controls the monitor 700 to easily select the desired module.

Software Interconnection: The modules 553-558 are also interconnected and controlled by means of a software program 600, illustrated by the flow chart in FIG. 23. The program 600 is stored in the user station 530, or, in the alternative, it could be loaded by means of the disc drive 701.

Figure 22:
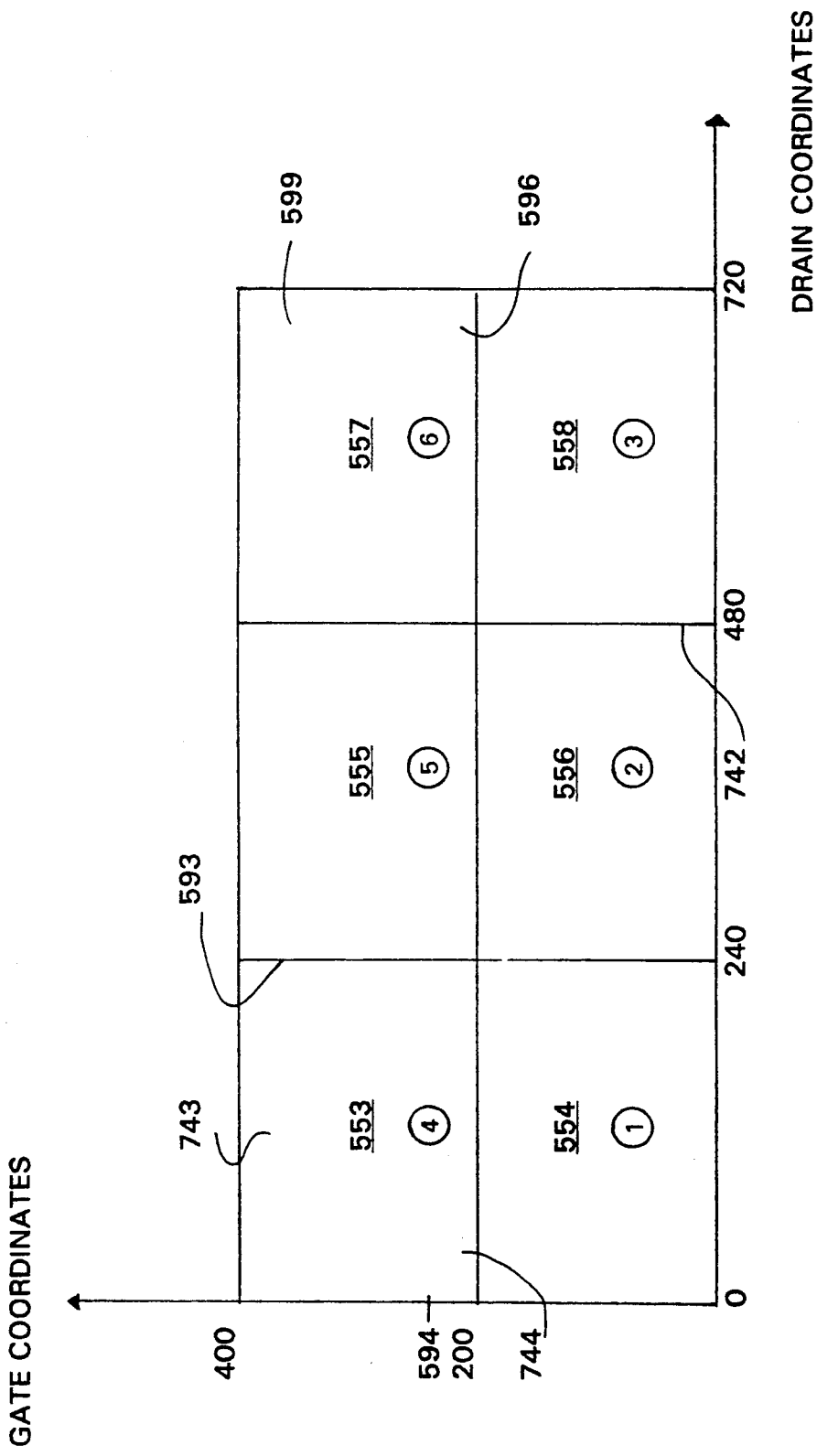
FIG. 22 illustrates a two-dimensional coordinates system on which the screen modules of FIG. 20 are represented as blocks.

Turning now to FIG. 22, there is illustrated a two-dimensional coordinates system on which the screen modules are represented as blocks, in order to show how the screen 501 is controlled by the program 600. The user instructs the user station 530 of the number of modules he or she intends to couple to the user station 530, or in the alternative, the number of modules the user wishes to activate on the screen 501. Upon this instruction, the software program 600 maps the coordinates of the drain elements along the horizontal axis of the coordinate system, and the gate elements along the vertical axis.

In this manner, the software has access to each pixel on the screen 501, and consequently, the user has a very flexible control of the screen 501. Thus, if for instance the user wishes to activate only three of the modules, such as the modules 553, 556 and 557, the user simply enters the number of the modules when instructed to do so by the program 600. In the present example, the user enters the numbers 4, 2 and 6.

The software program 600 then instructs and controls the conventional electronics of the user station 530 to display the image or information only on those selected modules. In this manner, the user can for instance view a text document on module 553, a graph on module 557, and a video display on module 556.

It should be understood that the user has control over the correlation of images to be viewed on the screen 501 and the particular module he or she wishes to view these images on. For instance, the user can ask the monitor 700 to display the text on module 556 instead of on module 553.

In the above example where the user has selected only three out of the already connected six modules, the software treats these three selected modules 553, 556 and 557, as if they were serially connected adjacent to another. In fact, depending on the selection priority or order assigned to the modules by the user, the software has the alternative to interconnect the modules in several ways, such as: (1) 553 - 556 -557; (2) 553 - 557 -556; (3) 556 - 553 - 557; (4) 556 - 557 - 553; (5) 557 - 553 - 556; (b 6) 557 - 556 - 553.

Let us take, for illustrating purposes example (5), where the modules are connected as 557 - 553 - 556. The user station 530 will then treat or view the modules as if: (a) the Gate Shift Register 599 of the module 557 is directly coupled to the Gate Shift Register 594 of the module 553; and (b) the Gate Shift Register 593 of the module 553 is directly coupled to the Gate Shift Register 742 of the module 558.

Depending on how the user wishes to view the modules, the user can instruct the software to interconnect the selected modules 553, 556 and 557 either in a horizontal row, or stacked one above the other, or as shown in FIG. 22, or as the user wishes. For illustration purposes let use consider that the user intends to view the modules as if they were stacked. In this case, the software treats the modules as if: (a) the Drain Shift Register 596 of the module 557 is coupled to the Drain Shift Register 743 of the module 553; and (b) the Drain Shift Register 744 of the module 553 is coupled to the Drain Shift Register 576A of the module 556.

This flexibility in selecting and viewing the modules in a pre-selected order has several applications. One such application relates to the use of the monitor 700 in the video telecommunication network 400, shown in FIG. 16. Let us assume for illustration purposes that in this application, there are three sites that wish to confer. The user at the first site, selects the number of modules he or she wishes to activate, and then assigns the modules to each one of the other sites conferring with such first user. The second and third users at the other ends assign their own modules.

Additionally, the signals S1, S2 and S3 from the three sites are transmitted to the central switching system 404, and processed as explained above, and then retransmitted to the monitors 402-1, 402-2 and 402-3 at the conferring sites as separate channels. The receiver monitor then reroutes each channel to the corresponding module, as selected by the particular user.

Therefore, the user at site 1, can view his or her own picture, or text on module 553, the picture from the second site on module 556, and the picture from the third site on module 557. Additionally, there can be two or more cameras in each site, if there are more than just one person at each site, or if it is desired to take pictures of graphs or similar other documents in addition to the pictures of the conferencees.

The conference can also be taped by each user by either taping the signals that are incoming from the central switching system 404, or, if editing is desired, the user can instruct the user station 530 to select the signals on the particular modules which he or she desires to tape and the user station 530 treats the signals from each module as if it were a separate channel and then transmits these signals and records them according to the above teachings.

Figure 23:
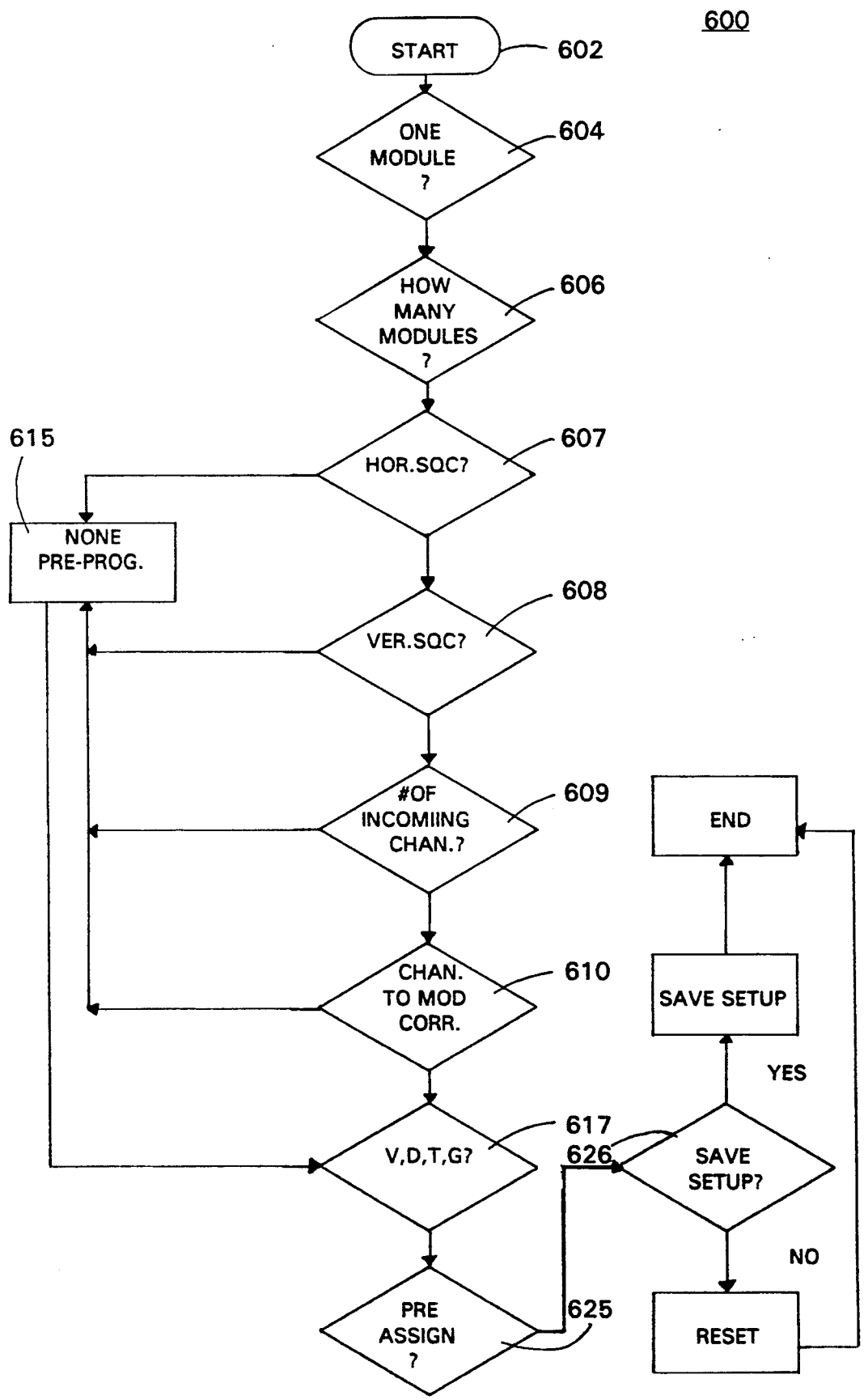
FIG. 23 is a flow chart illustrating the operation of the modular monitor of FIG. 21.

Turning now to FIGS. 21 and 23, the software program 600 is illustrated in the form of a simplified flow chart in FIG. 23, and the keyboard 750 of the user station 530 is illustrated in FIG. 21. When the user couples the screen 501 to the user station 530, the user presses a START button 752, and the software is initialized at 602. The software next automatically inquires at 604 whether there is only one module coupled to the user station 530, or desired to be activated.

If the answer is no, then the user presses the NO button 753, and the software displays the following question on a built-in screen 76: "HOW MANY MODULES?", as indicated at 606. In the alternative, the above question can be displayed on a dedicated module, such as the module 556. The user then enters the number of modules he or she wishes to activate, by using a keypad 754.

The software then displays the following question on the screen 76: "HORIZONTAL SEQUENCE OF MODULES?", as indicated by block 607. The user then enters the desired horizontal sequence of modules by using the keypad 754. In the above example, where the user wishes the following sequence of modules: 557 - 553 - 556 the user will enter the following sequence: (3,2), (1,2) and (2,1), or the following sequence, as is desired: (6,4,2). Both sequences will relate the desired horizontal module sequence to the software. The pair sequence indicates the coordinates of the module, while the second triple sequence indicates the number of the modules, as illustrated in FIG. 22.

The software then displays the following question on the screen 76: "VERTICAL SEQUENCE OF MODULES?", as indicated by block 608. The user then enters the desired vertical sequence of modules by using the keypad 754. The user will enter either one of the following sequences: (1,2), (2,1) and (3,2), or (4,2,6).

The following inquiry is then displayed on the screen 76: "NUMBER OF INCOMING CHANNELS?" as indicated at block 609. The user then enters the number of incoming channels using the keypad 754. The incoming channels refer for instance, to the channels that are being, or will be, transmitted by the central processing 404 of the teleconferencing system 400, illustrated in FIG. 16. Let us consider that the number of selected channels is three.

The software then asks the user to correlate the incoming channels to the selected modules at 610. The user then enters either one of the following sequences: (C1, 1,2), (C2, 2,1) and (C3, 3,2), or (C1,4; C2,2; C3,6). As such, incoming channels 1, 2 and 3 are assigned to modules 553, 556 and 558, respectively.

If on the other hand, the user does not find it necessary to correlate the incoming channels to the modules, as illustrated by block 611, or if the user does not have a preference for the vertical or horizontal interconnection of the modules, as indicated by blocks 612 and 614, then, as indicated at block 615, the software assigns the channels and the inter-modular interconnections in a pre-programmed, pre-selected way.

In the preferred embodiment for instance, the software will sequentially assign the incoming channels to the horizontal modules first in the first row, and then to the second horizontal row, starting with module 554, i.e. module 1. In the above example, incoming channels 1, 2 and 3 will be assigned to modules 554, 556 and 558 respectively, and the upper modules 553, 555 and 557 will not be activated, unless activated by the user at a later time.

The software then asks, the user, at 617, whether the incoming channel includes video (V), graphics (G), text (T) or data (D) information. The user then presses one of the corresponding buttons 762, 763, 764 and 767 to indicate the appropriate choice, by choosing the letter of his or her choice, and by entering the following sequence using the keypad 754: (C1,V); (C2,T); and (C3,V). This sequence will instruct the user station 530 to route channels 1 and 3 through a video mechanism to process the video images, and to route channel 2 to a computer for processing the text. Both the video mechanism and the computer are well known in the art. The present invention enables the simultaneous processing of video, text, graphics and data, and to display the same on a single modular screen.

The software then asks the user whether he or she wishes to reserve one or more dedicated modules, to another incoming channel, at 625. If an unexpected channel is transmitted to the monitor 700 while the some of the modules are activated, then the monitor 700 will automatically activate a CHANNEL WAITING feature, whereby the software automatically inquires whether the user wishes to be interrupted during the teleconferencing session. If the user does not wish to be disturbed, or if all the screen modules have been assigned to incoming channels, then the software automatically responds with a busy signal to the caller.

If on the other hand, the user expects a channel call during the conference session, then the user can pre-assign one or more modules to this expected channel call. As the call arrives, then the user station 530 automatically connects the call to the spare module, such as the module 555, and the software displays the following inquiry on the screen 760: "CONNECT TO TELECONFERENCE?". If the user wishes this incoming call to be part of the teleconference, then the user presses the YES button 755, and the software automatically reroutes the incoming call to the central processing system 404, where it is processed as one of the other incoming channels.

It should be understood that a sophisticated user can bypass the inquiries at 607, 608, 609, 610, 617 and 625, and can enter the following sequence instead: (C1,V,4), (C2,T,2), (C3,V,6).

The software then asks the user, at 626, whether he or she wishes to save the setup for future use? If the answer is yes, then the same setup will be used in future module assignments, until the setup is changed or reset. If the answer is no, then the assignment values will be reset at the end of the conference as indicated by block 628.

A REASSIGNMENT button 777 at the keyboard 750 enables the user to reassign the channels to different modules during the course of the conference session.

It should be understood to those skilled in the art, after reviewing the present specification, that more than one module can be assigned to a particular channel. If for example, the user wishes to use the user station 530 to preview a text or a video recording on the screen 501, the user can select all six or more modules for such preview, and the user is not limited to a single module.

In which case, the user can for instance, assign four modules, i.e. 553, 554, 555 and 556 to view a document, and assign modules 557 and 558 to perform selective tasks to manipulate or better preview the text displayed on the modules 553, 554, 555 and 556. For example, the user can identify the coordinates of the text he or she wishes to enlarge, using the coordinate system of FIG. 22, i.e. (Drain 0, 240; Gate 200, 300) and then ask the user station 530 to display the text on the modules 557 and 558, i.e. (Drain 480, 720; Gate 100, 400). The user station will copy the identified text and enlarge it to fit the new coordinates on modules 557 and 558.

IV. PAPERLESS NETWORK

The remote stations 512 and 514 generally represent a variety of companies or individuals. While only two remote stations 512 and 514 are illustrated, it should be understood that the network 500 includes a greater number of remote stations that are not shown. Therefore, only the two remote stations will be referred to hereinafter.

The network 500 further includes a host computer or switching central processing unit 516 which is connected to the remote stations 512 and 514 via communication links 518 and 520 respectively. The host computer 516 receives the information to be published and routes it to one or more local stations, such as the local stations 522 and 524, over communication links 565 and 566 respectively. It should however be understood that the remote stations 512 and 514 can, alternatively transmit or publish the information directly to the local stations 522 and 524, directly, without passing through the host computer 516.

The local stations 522 and 524 generally represent receiving stations for storing the information to be published. While only the local stations 522 and 524 are illustrated, it should be understood that the network 500 can include more than two local stations which are not shown. Therefore, only the local stations 522 and 524 will be referred to in the following specification.

Turning now to FIG. 18, the local stations 522 and 524 generally represent receiving stations for storing the information to be published. While only the two local stations 522 and 524 are illustrated, it should be understood that the network 500 can include more than two local stations. At the local stations 522 and 524, the information can be accessed by the users or subscribers through dedicated user stations, such as the user stations 526, 528, 530 and 532.

In operation, the publisher of the printed publications, such as a newspaper publishing company sends the information (publication) to be published over the remote station 512 via the host computer 516 to selected ones of the local stations 522 and 524, until subsequently updated by the published companies.

When the user wishes to retrieve the published information, he or she inserts a memory device, such as a floppy disc or a compact disc into the local station 522, and uplinks an interface software program from the disc to the local station. The interface software includes the user's identification number and the identification of the publications he or she is allowed to access.

In the alternative, the interface software can include credit information of the user, so that, if the user is not a subscriber, his or her address and other credit information are automatically downloaded to the local station 522 for future billing.

The user then interfaces with the local station 522 and downlinks the selected publications from the local station 522 to the disc. The publication could then be previewed by inserting the disc into the drive 701 (FIG. 21) of the user station 530, and the user operates the monitor 700 as described above in relation to the modular screen 501.

Considering now the local station 522 in more detail, it is generally located at locations which are readily accessible to the users, such as at the outside of building structures. The local station 522 generally includes a memory drive for receiving the memory device, such as the floppy disc, and a central processing unit (not shown).

A plurality of function keys permit the user to control hie or her own access to the selected publications. A series of light or visual indicators indicate the status of the local station during the transfer of information to the memory disc. A storage memory retains the published information for a predetermined period of time. Periodically, the published information is erased from the memory and updates.

While particular embodiments of the present invention have been disclosed, it is to be understood that various different modifications are possible and are contemplated within the scope of the specification, drawings, abstract and appended claims.

What is claimed is:

1. A network for providing video teleconferencing capability among several remote sites, comprising:
    a) central switching means for receiving and processing signals from the remote sites;
    b) means for generating video signals at the remote sites;
    c) means for transmitting said video signals to said central switching means;
    d) said central switching means including:
        i) means for allocating a different channel to said video signals from each one of the remote sites, each channel being indicative of one of the remote sites and having a predetermined carrier frequency;
        ii) means for scanning said allocated channels to generate signals identificative of said allocated channels;
        iii) means for feeding back said channel identifying signals to the remote sites over a first carrier frequency;
        iv) multiplexer means for compressing and multiplexing said video signals of said allocated channels, said multiplexer means including means for modulating said video signals over a second carrier frequency, sand said video signals being modulated over said predetermined carrier frequencies of their respective channels and over said second carrier frequency; and
        v) means for transmitting said multiplexer signals from said central switching means to the selecting remote sites; and
    e) each remote site including:
        i) selection means for using said feedback channel identifying signals to selectively identify and select the channels to be revised by each remote site;
        ii) means for receiving said multiplexed signals;
        iii) means for demultiplexing and separating said received signals into separate channels;
        iv) means for storing the separated signals for a predetermined period of time;
        v) means for decompressing and reconstructing the signals of the selected channel on a real-time basis; and
        vi) monitor means for displaying the reconstructed signals of the selected channel on a real-time basis.

2. The video teleconferencing network as defined in claim 1, wherein:
    a) said multiplexer means is responsive to said selection means from each one of the remote sites, for compressing and multiplexing only the channels which were selected by said selection means; and
    b) said means for transmitting transmits only said selected and multiplexed channels to the particular remote site which made the selection.

3. The video teleconferencing network as defined in claim 1, wherein:

a) said central switching means further comparator means for differentiating said video signals from the remote sites, and for comparing the differential signals to said video signals; and b) said multiplexer means samples only said video signals when the first derivative of said video signals is different from zero.

4. The video teleconferencing as defined in claim 1, wherein said means for generating video signals includes an optical system, said optical system comprising:

a) a plurality of lens system means for processing colors of different frequencies;

b) each one of said lens system means including shutter means, for generating amplitude vectorial signals proportional to the amplitude of the color signal being processed by said lens system;

c) each one of said lens systems further including means responsive to the frequency of the corresponding color being processed by said particular lens system, for frequency generating vectorial signals proportional to the frequency of the color signal being processed by said lens system;

d) amplitude mixing means for generating a resulting amplitude signal proportional to the vectorial sum of said amplitude vectorial signals; and e) frequency mixing means for generating a resulting frequency signal proportional to the vectorial sum of frequency vectorial signals.

5. The video teleconferencing network as defined in claim 4, a) wherein said optical system includes three lens system means for processing blue, red and green color signals;

b) wherein said amplitude vectorial signals are proportional to the amplitudes of the blue, red and green signals;

c) wherein said frequency vectorial signals are proportional to the frequencies of the blue, red and green signals;

d) wherein said lens systems are rotated with angular velocities (Wb, Wr and Wg) proportional to the frequencies of the blue, red and green colors respectively;

e) wherein said resulting vectorial amplitude signal (Ao) is calculated by mixing the blue, red and green amplitude vectorial signals (Ab, Ar and Ag), as follows:

$$Ao = Ar.l + Ag.m + Ab.n,$$

where l, m and n are unit vectors.

f) wherein said resulting vectorial frequency signal (Wo) is calculated by mixing the blue, red and green frequency vectorial signals (Wb, Wr and Wg), as follows:

$$Wo = Wr.i + Wg.j + Wb.k,$$

where i, j and k are unit vectors; and g) wherein said vectorial units 1, m and n have equal absolute values; and wherein the absolute values of said vectorial units i, j, and k are proportional to the selected frequencies of the red, green and blue colors respectively.

6. The video teleconferencing network as defined in claim 1, wherein said monitor means includes a modular monitor comprising:

a) a liquid crystal modular screen, for use by an individual user to display texts and graphics;

b) said modular screen including a plurality of modules selectively engageable to one another, by the individual user, to form a single unitary screen;

c) user station means adapted to be coupled to said single unitary screen, for controlling the display of information on said unitary screen; and d) said modules being disengageable from one another by the individual user.

7. The video teleconferencing network as defined in claim 6, wherein each one of said modules includes:

a) a plurality of horizontal matrix transistor elements, wherein each one of said transistor elements has a drain and a gate;

b) a plurality of vertical matrix transistor elements each;

c) drain shift register means for providing output signals from the drains of said vertical matrix transistor elements;

d) gate shift register means for providing output signals from the gates of said horizontal matrix transistor elements;

e) wherein said drain shift register means from said modules are selectively, serially coupled to form a single drain shift register for said unitary screen; and f) wherein said gate shift register means from said modules are selectively, serially coupled to form a single gate shift register for said unitary screen.

8. The video teleconferencing network as defined in claim 4, wherein said monitor means includes a modular monitor comprising:

a) a liquid crystal modular screen, for use by an individual user to display texts and graphics;

b) said modular screen including a plurality of modules selectively engageable to one another, by the individual user, to form a single unitary screen;

c) user station means adapted to be coupled to said single unitary screen, for controlling the display of information on said unitary screen; and d) said modules being disengageable from one another by the individual user.

9. The video teleconferencing network as defined in claim 5, wherein said monitor means includes a modular monitor comprising:

a) a liquid crystal modular screen, for use by an individual user to display texts and graphics;

b) said modular screen including a plurality of modules selectively engageable to one another, by the individual user, to form a single unitary screen;

c) user station means adapted to be coupled to said single unitary screen, for controlling the display of information on said unitary screen; and d) said modules being disengageable from one another by the individual user.

10. The video teleconferencing network as defined in claim 5, wherein each one of said modules includes:

a) a plurality of horizontal matrix transistor elements, wherein each one of said transistor elements has a drain and a gate;

b) a plurality of vertical matrix transistor elements each;

c) drain shift register means for providing output signals from the drains of said vertical matrix transistor elements;

d) gate shift register means for providing output signals from the gates of said horizontal matrix transistor elements;

e) wherein said drain shift register means from said modules are selectively, serially coupled to form a single drain shift register for said unitary screen; and f) wherein said gate shift register means from said modules are selectively, serially coupled to form a single gate shift register for said unitary screen.

11. A teleconferencing method for providing selective video communication capability among a plurality of remote sites and a central video switching exchange (CVSE), the teleconferencing method comprising the steps of:

a) initiating a video call to one or more remote sites for participating in a video teleconferencing session;

b) the CVSE allocating a plurality of different video channels to the participating remote sites, each video channel corresponding to one of the participating remote sites;

c) the CVSE generating signals for identifying said video channels, said video identifying signals being distinct from said video channels;

d) transmitting said channel identifying signals to the participating remote sites;

e) each of the remote sites selecting the desired video identifying signals indicative of the desired video channels to be viewed at the selecting remote site;

f) the remote sites feeding back said selected video identifying signals to the CVSE;

g) the CVSE scanning said fed back video identifying signals for identifying the video channels selected by each of the remote sites;

h) the CVSE compressing and multiplexing said allocated video channels and modulating said video channels over a second carrier frequency, each of said video channels having a predetermined carrier frequency, and said video channels including video signals being modulated over said predetermined carrier frequencies of their respective video channels and over said second carrier frequency, the CVSE compressing and multiplexing said signals from said allocated video channels into separate video signal packets, each packet corresponding to the particular selection of the video channels made by one of the remote sites;

i) the CVSE transmitting said video signal packets to the corresponding remote site;

j) each of the remote sites receiving its corresponding compressed and multiplexed video signal packet;

k) each of the remote sites demultiplexing and separating the received video signal packets into separate video channels;

l) each of the remote sites reconstructing the demultiplexed video channels on a real-time basis; and m) each of the remote sites displaying the signals of said reconstructed video channels on a real-time basis.

12. The teleconferencing method as defined in claim 11, wherein the CVSE continually scans said fed back video identifying signals for identifying the video channels selected by each of the remote sites, and for compressing and transmitting only the signals from those video channels which were individually selected by each of the remote sites.

13. The teleconferencing method as defined in claim 12, further including the step of having the CVSE pass the video signals incoming from each of the remote sites through a Fourier transformer for generating sinusoidal signals.

14. The teleconferencing method as defined in claim 13, further including the step of limiting the incoming video signals from the remote sites to the most desirable sinusoidal signals.

15. The teleconferencing method as defined in claim 14, wherein said step of compressing and multiplexing, includes compressing and multiplexing only those desirable sinusoidal signals.

16. The teleconferencing method as defined in claim 11, further including the steps of:

a) differentiating the video signals incoming from the remote sites; and b) sampling only those video signals whose first derivative is different from zero.

17. The teleconferencing method as defined in claim 11, further including the steps of:

a) differentiating the video signals (Sn) incoming from the remote sites for generating first derivative signals (dSn/Dt); and b) differentiating said first derivative signals (dSn/dt) for generating second derivative signals (ddSn/ddt).

18. The teleconferencing method as defined in claim 13, further including the steps of:

a) differentiating the desired Fourier transformed video signals (Sn) incoming from the remote sites for generating first derivative signals (dSn/dt);

b) differentiating said first derivative signals (dSn/dt) for generating second derivative signals (ddSn/ddt); and c) adding said Fourier transformed video signals (Sn) to said corresponding second derivative signals (ddSn/ddt) to generate signals DSn.

19. A video teleconferencing network for providing selective video communication capability among a plurality of remote sites and a central video switching exchange (CVSE), the teleconferencing network comprising:

a) means for initiating a video call to one or more remote sites for participating in a video teleconferencing session;

b) means for allocating a plurality of different video channels to the participating remote sites, each video channel corresponding to one of the participating remote sites;

c) means for generating signals for identifying said video channels, said video identifying signals being distinct from said video channels;

d) means for transmitting said channel identifying signals to all the participating remote sites;

e) control mean located at the remote sites for selecting the desired video identifying signals indicative of the desired video channels to be viewed at the selecting remote site;

f) feed-back means at the remote sites for feeding back said selected video identifying signals to the CVSE;

g) means for scanning said fed back video identifying signals for identifying the video channels selected by each of the remote sites;

h) multiplexer means for compressing and multiplexing said allocated video channels and modulating said video channels over a second carrier frequency, each of said video channels having a predetermined carrier frequency, and said video channels including video signals being modulated over the predetermined carrier frequencies of their respective video channels and over said second carrier frequency, said multiplexer means compressing and multiplexing said video signals from said allocated video channels into separate video signal packets, each packet corresponding to the particular selection of the video channels made by one of the remote sites;

i) means for transmitting said video signal packets to the corresponding remote site;

j) reception means at the remote sites for receiving a corresponding compressed and multiplexed video signal packet;

k) means located at the remote sites for demultiplexing and separating the received video signal packets into separate video channels;

l) means for reconstructing the demultiplexed video channels, at the remote sites, on a real-time basis; and m) display means at the remote sites for displaying the signals of said reconstructed video channels on a real-time basis.

20. The teleconferencing network as defined in claim 19, wherein:

a) the CVSE includes means for continually scanning said fed back video identifying signals for identifying the video channels selected by each of the remote sites, and for compressing and transmitting only the signals from those video channels which were individually selected by each of the remote sites;

b) Fourier transform means for transforming the video signals incoming from each of the remote sites through to generate sinusoidal signals (Sn);

c) means for limiting said Fourier transformed video signals (Sn) from the remote sites to the most desirable sinusoidal signals;

d) means for differentiating said video signals (Sn) for generating first derivative signals (dSn/dt);

e) means for differentiating said first derivative signals (dSn/dt) for generating second derivative signals (ddSn/ddt); and f) means for adding said Fourier transformed video signals (Sn) to said corresponding second derivative signals (ddSn/ddt) to generate signals DSn.

* * * * *